United States Patent

Iwaguchi et al.

[11] Patent Number: 5,932,861
[45] Date of Patent: Aug. 3, 1999

[54] AMBIENT LIGHT DETECTOR, LIGHT SOURCE LIGHTING CONTROLLING DEVICE, AND READER

[75] Inventors: Isao Iwaguchi; Shinichi Sato; Ichiro Shinoda, all of Kawasaki, Japan

[73] Assignee: Fujitsu Limited, Kawasaki, Japan

[21] Appl. No.: 08/550,839

[22] Filed: Oct. 31, 1995

[30] Foreign Application Priority Data

Nov. 1, 1994 [JP] Japan .................................. 6-269043
Oct. 20, 1995 [JP] Japan .................................. 7-273319

[51] Int. Cl.$^6$ ..................................................... G06K 7/10
[52] U.S. Cl. ............... 235/455; 235/462.06; 235/462.39; 235/472.01
[58] Field of Search ..................................... 235/455, 462, 235/472, 462.06, 462.39, 472.01

[56] References Cited

U.S. PATENT DOCUMENTS

| | | | |
|---|---|---|---|
| 4,970,379 | 11/1990 | Danstrom | 250/205 |
| 5,003,288 | 3/1991 | Wilhelm | 340/457.2 |
| 5,015,831 | 5/1991 | Eastman et al. | 235/462 |
| 5,115,120 | 5/1992 | Eastman | 235/462 |
| 5,239,295 | 8/1993 | DeLuca et al. | 340/825.44 |
| 5,291,884 | 3/1994 | Heinemann et al. | 128/633 |
| 5,296,695 | 3/1994 | Bardos et al. | 250/205 |
| 5,299,212 | 3/1994 | Koch et al. | 372/32 |
| 5,382,782 | 1/1995 | Hasegawa et al. | 235/455 |
| 5,406,173 | 4/1995 | Mix et al. | 315/156 |
| 5,491,330 | 2/1996 | Sato et al. | 250/214 |
| 5,510,607 | 4/1996 | Ishikawa | 235/455 |
| 5,532,467 | 7/1996 | Roustaei | 235/472 |
| 5,581,071 | 12/1996 | Chen et al. | 235/455 |
| 5,597,997 | 1/1997 | Obata et al. | 235/455 |
| 5,602,861 | 2/1997 | Kawai et al. | 235/455 |

FOREIGN PATENT DOCUMENTS

| | | | |
|---|---|---|---|
| 2-280-953 | 2/1995 | United Kingdom | 235/455 |
| WO 92-05515 | 4/1992 | WIPO | 235/455 |

*Primary Examiner*—Donald Hajec
*Assistant Examiner*—Douglas X. Rodriguez
*Attorney, Agent, or Firm*—Nikaido, Marmelstein, Murray & Oram LLP

[57] ABSTRACT

The present invention relates to an ambient light detector that detects a change in light amount of ambient light. The ambient light detector consists of ambient light detecting means for detecting light entering from circumferences and outputting an electrical signal corresponding to the light amount thereof; amplifying means for amplifying the output from the ambient light detecting means; signal producing means for producing a slice level signal based on the output from the amplifying means; comparing means for comparing the output of the amplifying means with the slice level signal; and judging means for judging the level of the output from the amplifying means and then outputting a control signal to control the amplifying factor of the amplifying means, according to the judging result. Ambient light can be stably detected without depending on installation mode or external environment.

26 Claims, 28 Drawing Sheets

F I G. 18
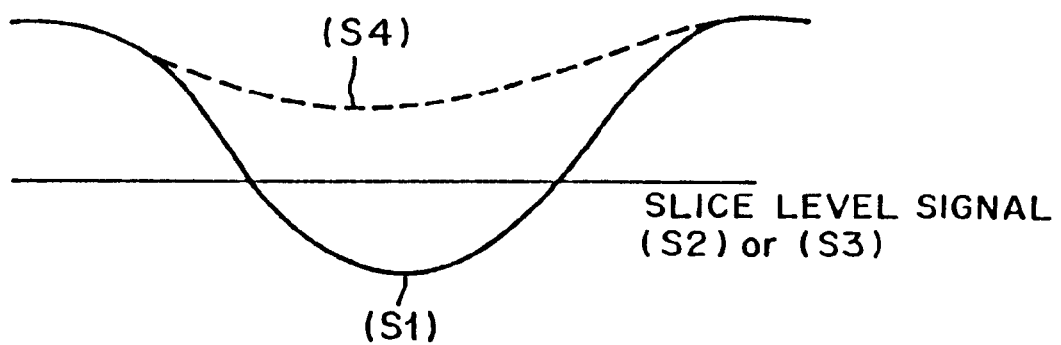

AMBIENT LIGHT DETECTOR, LIGHT SOURCE LIGHTING CONTROLLING DEVICE, AND READER

BACKGROUND OF THE INVENTION

1) Field of the Invention

The present invention relates to an ambient light detector that detects a change in light amount of ambient light, a light source lighting controlling device that controls lighting of a light source using the ambient light detector, and a reader including the ambient light detector and/or the light source lighting controlling device.

2) Description of the Related Art

Conventionally, bar-code readers have been widely used to read bar-codes. The bar-code reader reads a bar-code by irradiating and scanning light flux such as a laser beam onto an article and then condensing and detecting the light flux reflected on the article.

FIG. 25 is a block diagram used for explaining the configuration of a general bar-code reader. Referring to FIG. 25, numeral 101 represents a bar-code printed on a surface of an article. The bar-code 101 includes plural white bars and plural black bars arranged alternately to each other.

Numeral 102 represents an optical system for a bar-code reader. Numeral 103 represents a laser emitting unit, e.g. a laser light source, emitting a laser beam L1.

Numeral 104 represents a scanning mechanism. The scanning mechanism 104 scans the laser beam L1 emitted from the laser emitting unit and sends out of the bar-code reader, and irradiates the scanning beam L2 onto the bar-code 101 while it sends the reflected beam R2 into the photoelectric converting unit (to be described later) in response to the reflection beam R1 reflected on the bar-code 101.

The scanning mechanism 104 is formed of, for example, a polygon mirror driven by a motor and a Galvano-mirror. When the polygon mirror is rotated, the laser beam reflected with the polygon mirror is scanned in a fixed direction and at a fixed rate.

Additionally some scanning mechanisms 104 include a split mirror which produces plural scanning beams L2 from a laser beam scanned with a polygon mirror.

Numeral 105 represents a photoelectric converting unit. The photoelectric converting unit 105 receives the reflected beam R2 irradiated from the scanning mechanism 104 and then outputs an analog electrical signal corresponding to the incident light amount. A photoelectric converting element such as a photo diode is used as the photoelectric converting unit 105.

Numeral 106 represents an A/D converter. The A/D converter 106 converts an analog electrical signal output from the photoelectric converting unit 105 into a digital electrical signal. When the A/D converter 106 converts an electrical signal from the photoelectric converting unit 105 into a digital signal, a binary signal formed of a bar-code 101, which includes a black level signal corresponding to a black bar and a white level signal corresponding to a white bar, is obtained.

Numeral 107 represents a bar-width counter. The bar-width counter 107 counts the time width of a black level signal and the time width of a white level signal output from the A/D converter 106, based on clock signals produced by the clock generator 108. The time width of the black level signal corresponds to the width of a black bar while the time width of the white level signal corresponds to the width of a white bar.

Numeral 109 is a memory. The memory 109 stores a count value output from a bar-width counter, or bar-width data. The CPU 110 receives the count value to demodulate bar-code data.

Formerly, the He-Ne gas laser has been used as a laser light source. Recently small bar-code readers have been demanded. However, since the gas laser is bulky, it has been difficult to bring the bar-code reader to a small size. Hence semiconductor lasers are being preferably used as laser light sources. There is a problem in that although the semiconductor laser, smaller than the gas laser, provides low power consumption, but it has a shorter service life.

In operation of the bar-code reader employing a semiconductor laser, various methods have been tried to prolong the effective service life of the laser light source.

In an example of a bar-code reader, the laser light source is turned off when the bar-code 101 is not read for a predetermined period and it is reactivated when the bar-code is read again. Means in which an operator controls a switch to activate and cut off a laser light source is used as the reactivating means.

However, such a method has a disadvantage in that because an operator must operate the laser light source to light it on, the good reading operability is not obtained.

As another method, it has been considered to prepare a different light source such as LED in the bar-code reader, in addition to the laser light source. In this method, it is investigated whether the sensor detects light reflected on an approaching article, with the LED emitting. Activating or deactivating the laser light source is controlled based on the presence or absence of the reflected light.

However, the position where the LED is mounted on the bar-code reader is limited. Even if the semiconductor laser is turned off, the LED continues its lighting operation, thus consuming its electric power. The continuous lighting shortens the operational life of the LED, thus causing replacing frequently LEDs. In consideration of such a problem, there is a possibility that employing the LED leads to the higher cost than that of the general bar-code reader.

As a further different method, Japanese Patent Laid-open Publication (TOKKAIHEI) No. 5-55555 discloses the following art.

Referring to the art disclosed in No. 5-55555, as an article or an operator's hand approaches the reading window in a bar-code reading operation, the light amount of an external light (hereinafter referred to as ambient light) around the reader changes. For that reason, a sensor which detects a change in the ambient light is arranged to the bar-code reader so that the lighting of the laser light source is controlled according to the detection result of the ambient light change.

FIG. 26 is a block diagram used for explaining an art disclosed in the above-mentioned Japanese Patent Laid-open Publication No. 5-55555. Referring to FIG. 26, numeral 111 represents an ambient light detector which detects ambient light. The ambient light detector detects ambient light and then outputs an electrical signal corresponding to the light amount thereof.

Numeral 112 represents an amplifier which amplifies an electrical signal output from the ambient light detector. Of signals output from the amplifier 112, the signal (1) representing an ambient light level is input directly to the comparator 113. The integrator 114 slopes the output (2) of the amplifier 112 and then inputs the result to the voltage divider 115. The voltage divider 115 divides the input signal in a voltage ratio and then inputs the resultant output signal as a slice level to the comparator 113.

For example, the ambient light detector 111 detects the ambient light level signal (1), as shown in FIG. 27, while the integrator 114 and the voltage divider 115 set the slice level as shown with the signal (2). These signals (1) and (2) are input to the comparator 113.

The comparator 113 compares the ambient light level signal (1) with the slice level signal (2) and then outputs a switch signal according to the comparison result. In other words, when the ambient light level, for example, is less than the slice level, the switch signal (3) shown in FIG. 27 is output. The switch signal is continuously output for a period during which the ambient light level is smaller than that of the slice level.

The semiconductor laser is controlled so as to be lighted on during which the switch signal is in on state.

When an article is arranged over the reading window to read the bar-code, the ambient light detector detects an ambient light with an area smaller than that of the ambient light prior to the bar-code reading operation. In this art, when the detected ambient light becomes smaller, it is judged that the bar-code reading operation is being performed. Thus the semiconductor laser is emitted only for the reading period.

In the art shown in FIG. 26, the above-mentioned configuration can perform an automatic lighting control of the laser light source over the reading operation to control lighting of the laser light source according to a change in level of ambient light.

However, the above-mentioned art has disadvantages as follows:

The bar-code readers are arranged in various modes and in various external environments.

For example, the bar-code reader may be installed with the reading surface upward or horizontally. Hence, even if the bar-code reader is installed under the same condition regarding external environment such as the level of ambient light, the ambient light level and the degree of ambient light level change are detected differently, with the different installation mode.

The bar-code reader may be installed in a place where the amount of ambient light is small or a very bright place where sunlight falls directly. Moreover it is considered that the bar-code reader also may be installed in a place where a change in ambient light is large or a place where a change in ambient light is small.

It may be considered that even if the same operator reads the same article, an installation environment of the bar-code reader does not allow detecting a change of ambient light level in the case where the same ambient light detection mode (including the slice level setting mode to detect a change in ambient light) exists completely. With different operators, there is the difference in reading operation among individuals.

That is, the distance between an article arranged over the reading window and the ambient light detector depends on the operator's reading operation. As a result, a change in amount of ambient light level is detected differently.

In other words, when the ambient light level is detected as the signal (1) shown in FIG. 28(*a*) and the slice level is set as the signal (2), provided that a change in ambient light level signal (1) varies at small value, the ambient light level signal (1) is not lowered less than the slice level signal (2). Hence the ambient level signal is not be detected (refer to (a1) and (a2) shown in FIG. 28(*a*)). In this case, in spite of a completion of the reading operation, the semiconductor laser is not emitted.

As shown in FIG. 28(*b*), when the level of an input ambient light is very close to the lower limit level, the difference between the ambient light level signal (1) and the slice level signal (2) is very small. In this case, if noises are superposed on the signal (1) or (2), a change in ambient light is erroneously detected.

For example, as shown with the broken lines (c1) and (c2) in FIG. 28(*c*), noise may be superposed on the ambient light level signal (1). In other words, when noise is superposed on the ambient light level signal (1) as shown with the broken line (c1), it is judged that the ambient light level signal is less than the slice level due to the effect of the noise even if the ambient light level signal is not less than the slice level.

On the contrary, when noise may be superposed on the ambient light level signal (1) as shown with the broken line (c2), it is judged that the ambient light level signal is more than the slice level due to the effect of the noise even if the ambient light level signal is less than the slice level.

In such a case, the semiconductor laser is not emitted on or off desirably. After all, there is a problem in that the automatic lighting control of a semiconductor laser cannot be handled well.

SUMMARY OF THE INVENTION

The present invention is made to overcome the above mentioned problems. An object of the present invention is to provide an ambient light detector that can stably detect ambient light, without depending on installation mode or external environment.

Another object of the present invention is to provide a light source lighting control device that can stably detect ambient light, without depending on installation mode or external environment.

Further object of the present invention is to provide a reader that can stably detect ambient light, without depending on installation mode or external environment.

In order to achieve the above objects, according to the present invention, the ambient light detector is characterized by ambient light detecting means for detecting light entering from circumferences and then outputting an electrical signal corresponding to the light amount thereof; amplifying means for amplifying the output from the ambient light detecting means; signal producing means for producing a slice level signal based on the output from the amplifying means; comparing means for comparing the output of the amplifying means with the slice level signal; and judging means for judging the output from the amplifying means and then outputting a control signal to control the amplifying factor of the amplifying means, according to the judging result.

In this case, the judging means includes first comparing means for comparing the output of the amplifying means with a first reference value; and second comparing means for comparing the output of the amplifying means with a second reference value different from the first reference value; the amplifying factor of the amplifying means being controlled according to the output from the first comparing means or the second comparing means.

According to the ambient light detecting device of the present invention, since the amplifying factor is decreased at a large ambient light level and increased at a small ambient light level. Therefore there is an advantage in that the ambient light level signal and the slice level signal can be adjusted to a value suitable to a circuit and a change in ambient light level can be stably detected. Furthermore, there is an advantage in that since the light source can be turned on only at a necessary time, the durability of the light source can be improved and the system maintenance cost can be remarkably reduced.

According to the present invention, the ambient light detector is characterized by ambient light detecting means for detecting light entering from circumferences and then producing an electrical signal corresponding to the light amount thereof; signal producing means for producing a slice level signal based on the electrical signal output from the ambient light detecting means; comparing means for comparing the output of the ambient light detecting means with the slice level signal; and judging means for judging the level of an output from the ambient light detecting means and then outputting a control signal to control the level of the slice level signal, according to the judging result.

In this case, the signal producing means includes voltage dividing means for dividing the output from the ambient light detecting means according to a predetermined voltage division ratio to produce a slice level signal, the voltage division ratio of the voltage dividing means being controlled according to the control signal output from the judging means.

According to the ambient light detecting device of the present invention, there is an advantage in that the slice level signal can be adjusted to a suitable value and a change in ambient light can be stably detected without depending on the change width of an ambient light level. Moreover, there is an advantage in that since the light source can be turned on only at a necessary time, the durability of the light source can be improved and the system maintenance cost can be remarkably reduced.

Moreover, according to the present invention, the ambient light detector is characterized by ambient light detecting means for detecting light entering from circumferences and outputting an electrical signal corresponding to the light amount thereof; signal producing means for producing a slice level signal; comparing means for comparing the electrical signal with the slice level signal and then outputting a signal corresponding to the result; and time measuring means for starting time-measurement on turning on power source and then outputting a control signal after a lapse of a predetermined period of time, the time measuring means being reset according to the comparison result from the comparing means; the time measuring means sending the control signal to the signal producing means to control the level of the slice level signal when it has detected the predetermined period of time.

The ambient light detector according to the present invention can control the comparing means not to detect a change in ambient light, without troubling the lighting of a light source in a reading operation even if the a small change in ambient light due to no bar-code reading operation occurs. There is an advantage in that a change in ambient light due to a bar-code reading operation can be distinguished from changes in ambient light due to other causes and a change in ambient light level can be detected stably.

When the bar-code reading, for example, is not performed for a long time, an ambient light change erroneous detection due to causes other than the bar-code reading operation as well as an unnecessary lighting of the light source can be prevented. Thus there are advantages in that the ambient light detector can suppress the power consumption, improve the durability of a light source, and reduce the system maintenance cost.

According to the present invention, the ambient light detector is characterized by ambient light detecting means for detecting light entering from circumferences and producing an electrical signal corresponding to the light amount thereof; control means for outputting a predetermined slice level signal; comparing means for comparing the electrical signal with the slice level signal and then outputting a signal corresponding to the result; and switching means for switching the operational status of the control means; the control means storing the level of the electrical signal sent from the ambient light detecting means when the operational status is switched by an operation of the switching means and then producing a slice level signal based on the level of the electrical signal stored.

In this case, the control means stores the electrical signal from the ambient light detecting means in the form of a digital signal and then produces a slice level signal in the form of a digital signal and wherein the control means comprises analog to digital converting means for converting an output signal from the ambient light detecting device into a digital signal and then outputting the result to the control means, and digital to analog converting means for converting a digital slice level signal sent from the control means into an analog slice level signal and then outputting the result to the comparing means.

According to the ambient light detector of the present invention, a change in ambient light level can be detected using a preset slice level signal or a created slice level signal according to the operation of the switching means and particularly a small change in ambient light due to a cause other than the bar-code reading operation can be detected, whereby the light source can be lighted only to a necessary time. Hence there is an advantage in that the durability of the light source can be improved and the system maintenance cost can be remarkably reduced.

According to the present invention, the ambient light detector is characterized by ambient light detecting means for detecting light entering from circumferences and outputting an analog electrical signal corresponding to the light amount thereof; analog to digital converting means for converting an analog electrical signal representing the level of ambient light output from the ambient light detecting means into a digital signal; and control means for comparing the level of the digital signal from the analog to digital converting means with a predetermined reference value and then outputting a switch signal according to the comparison result to switch the range of the analog to the control means.

According to the ambient light detector of the present invention, since the ambient light level signal and the slice level signal can be adjusted to a suitable value according to the change width of an ambient light level, a change in ambient light can be stably detected, like the above-mentioned detector. Moreover, any special hardware is not required to compare an ambient light level change with the reference voltage and the control means performs the process ranging from the ambient light change detection to the light source control by one operation. There is an advantage in that the system configuration can be simplified.

According to the present invention, the ambient light detector is characterized by plural ambient light detecting means each for detecting light entering from circumferences and outputting an electrical signal corresponding to the light amount thereof; switching means connected to each of the plural ambient light detecting means, for validating the operation of one of the plural ambient light detecting means; and control means for comparing an electrical signal output from one in operation among the plural ambient light detecting means with a predetermined reference value and then outputting a control signal according to the comparison result to control the on/off operation of the switching means, thus selecting the ambient light detecting means to be operated.

Hence according to the ambient light detector of the present invention, since the ambient light level signal and the slice level signal can be adjusted to a value suitable to a circuit, a change in ambient light level can be detected advantageously and stably, like the above-mentioned detector. Plural ambient light detecting means each which outputs a different level electrical signal can vary substantially the amplifying factor of the ambient light level signal. Hence there is an advantage in that the system design can be simplified because of no need of controlling the amplifying factor of the amplifying means.

According to the present invention, the light source lighting controlling device which includes a light source and turns controllably on and off said light source, is characterized by ambient light detecting means for detecting light entering from circumferences and outputting an electrical signal corresponding to the light amount thereof; amplifying means for amplifying the output from the ambient light detecting means; signal producing means for outputting a slice level signal based on the output from the amplifying means; comparing means for comparing the output of the amplifying means with the slice level signal and then outputting a signal according to the comparison result; light source drive circuit for controlling the lighting status of the light source according to the output from the comparing means; and judging means for judging the level of the output from the amplifying means and then outputting a control signal to control the amplifying factor of the amplifying means, according to the judging result.

In this case, the judging means includes first comparing means for comparing the output of the amplifying means with a first reference value; and second comparing means for comparing the output of the amplifying means with a second reference value different from the first reference value; the amplifying factor of the amplifying means being controlled according to the output from the first comparing means or the second comparing means.

According to the light source lighting controlling device of the present invention, since the amplifying factor is decreased at a large ambient light level and increased at a small ambient light level, the ambient light level signal and the slice level signal can be adjusted to a suitable value so that a change in ambient light level can be stably detected. Moreover since the light source can be lighted at a necessary time, the durability of the light source can be improved and the system maintenance cost can be reduced.

According to the present invention, the light source lighting controlling device which includes a light source and turns controllably on and off the light source, is characterized by ambient light detecting means for detecting light entering from circumferences and outputting an electrical signal corresponding to the light amount thereof; signal producing means for producing a slice level signal based on the output from the ambient light detecting means; comparing means for comparing the output of the amplifying means with the slice level signal and then outputting a signal according to the comparison result; light source drive circuit for performing the lighting control of the light source according to the output from the comparing means; and judging means for judging the output from the ambient light detecting means and then outputting a control signal to control the level of the slice level signal, according to the judging result.

In this case, the signal producing means includes a voltage dividing means for dividing the output from the ambient light detecting means in a predetermined voltage division ratio to produce a slice level signal, the voltage division ratio of the voltage dividing means being controlled according to the control signal output from the judging means.

According to the light source lighting controlling device of the present invention, the slice level signal can be adjusted to a suitable value and a change ambient light can be stably detected without depending on the change width of an ambient light level. Moreover, there is an advantage in that since the light source can be lighted only a desired time, the durability of the light source can be improved and the system maintenance cost can be reduced remarkably.

According to the present invention, the light source lighting controlling device which includes a light source and turns controllably on and off said light source, is characterized by ambient light detecting means for detecting light entering from circumferences and then outputting an electrical signal corresponding to the light amount thereof; signal producing means for producing a slice level signal; comparing means for comparing the electrical signal with the slice level signal and then outputting a signal corresponding to the result; light source drive means for performing lighting control of the light source in accordance with the signal output from the comparing means; and time measuring means for starting time-measurement on turning on power source and then outputting a control signal after a lapse of a predetermined period of time, the time measuring means being reset according to the comparison result from the comparing means; the time measuring means sending the control signal to the signal producing means to control the level of the slice level signal when it has detected the predetermined period of time.

Hence, according to the present invention, even if a small change in ambient light not caused by no bar-code reading operation occurs without troubling the lighting of the light source in a reading operation, the light source lighting controlling device can control the comparing means not to detect a small change in ambient light. In other words, there is an advantage in that a change in ambient light due to a bar-code reading operation is distinguished from a change in ambient light due to other causes so that a change in ambient light can be detected stably.

When a bar-code reading, for example, is not performed for a long time, a change in ambient light due to causes other than a bar-code reading operation is erroneously detected and it is possible to prevent unnecessary lighting of a light source. Thus there is an advantage in that the light source lighting controlling device can suppress power consumption, improves the durability of a light source, and reduces extremely the system maintenance cost.

Furthermore, according to the present invention, the light source lighting controlling device which includes a light source and turns controllably on and off said light source, is characterized by ambient light detecting means for detecting light entering from circumferences and outputting an electrical signal corresponding to the light amount thereof; control means for outputting a predetermined slice level signal; comparing means for comparing said electrical signal with the slice level signal and then outputting a control signal corresponding to the result; light source drive means for performing lighting control of the light source in accordance with the control signal; and switching means for switching the operational status of the control means; the control means storing the level of the electrical signal sent from the ambient light detecting means based on the operational status switched due to an operation of the switching means and produces a slice level signal based on the level of the electrical signal stored.

In this case, the light source lighting controlling device is characterized by further including analog to digital converting means for converting an output signal from the ambient light detecting device into a digital signal and then outputting the result to the control means, and digital to analog converting means for converting a digital slice level signal sent from the control means into an analog slice level signal and then outputting the result to the comparing means; the control means storing an electrical signal from the ambient light detecting means in the form of a digital signal and produces a slice level signal in the form of a digital signal.

Therefore, according to the light source lighting controlling device of the present invention, since a change in ambient light level can be detected using a preset slice level signal or a created slice level signal according to the operation of the switching means, a small change in ambient light due to causes other than the bar-code reading operation can be particularly detected and the light source can be lighted only at a necessary lighting operation.

According to the present invention, the light source lighting controlling device which includes a light source and turns controllably on and off the light source, is characterized by ambient light detecting means for detecting light entering from circumferences and outputting an analog electrical signal corresponding to the light amount thereof; analog to digital converting means for converting an analog electrical signal output from the ambient light detecting means into a digital signal; control means for comparing the digital signal with a reference value and then outputting a control signal according to the comparison result; and light source drive means for performing the lighting control of the light source in accordance with the control signal from the control means; the control means investigating the level of a digital signal and then outputting a switch signal to switch the range of the analog to digital converting means when the digital signal is larger than the predetermined upper limit value or smaller than the predetermined lower limit value.

According to the light source lighting controlling device according to the present invention, since the ambient light level signal and the slice level signal can be adjusted to a suitable value according to the change width of an ambient light level, a change in ambient light can be detected stably, similarly to the above-mentioned case. Moreover, there is an advantage in that since the control means can perform a process ranging from an ambient light change detection to a light source control by one operation, without needing no special hardware to compare an ambient light level signal with a reference voltage, the system configuration can be simplified.

Moreover, according to the present invention, the light source lighting controlling device which includes a light source and turns controllably on and off the light source, is characterized by plural ambient light detecting means each for detecting light entering from circumferences and outputting an electrical signal corresponding to the light amount thereof; switching means connected to each of the plural ambient light detecting means, for validating the operation of one of the plural ambient light detecting means; and control means for comparing an electrical signal output from one in operation among the plural ambient light detecting means with a predetermined reference value and outputting a control signal according to the comparison result to control the on/off operation of the switch; and light source drive means for controlling the lighting of the light source according to the control means; the control means comparing the electrical signal with the upper limit value and the lower limit value each preset and outputting a control signal to turn controllably on or off the switch according to the result, thus selecting the ambient light detecting means to be operated.

Hence according to the light source lighting controlling device of the present invention, since the ambient light level signal and the slice level signal can be adjusted to a value suitable to a circuit, a change in ambient light can be detected stably, similarly to the above-mentioned case. Moreover, there is an advantage in that since plural ambient light detecting means each which outputs a different level electrical signal can change substantially the amplifying factor of an ambient light level signal, the amplifying factor of the amplifying means is not needed so that the system configuration can be simplified.

According to the present invention, the reader which includes a light source and light detecting means, wherein a mark formed on an article is read by operationally irradiating light from the light source onto the article and detecting light reflected on the article using light detecting means, is characterized by ambient light detecting means for detecting light entering from circumferences and then outputting an electrical signal corresponding to the light amount thereof; amplifying means for amplifying the output from the ambient light detecting means; voltage dividing means for dividing the output from the amplifying means into a predetermined voltage division ratio; comparing means for comparing the output of the amplifying means with the output of the voltage dividing means and outputting a signal according to the comparison result; light source drive means for controlling the lighting status of the light source in accordance with the output signal from the comparing means; and judging means for judging the output from the amplifying means and then outputting a control signal to control the amplifying factor of the amplifying means, according to the judging result.

In this case, the judging means includes first comparing means for comparing the output of the amplifying means with a first reference value; and second comparing means for comparing the output of the amplifying means with a second reference value different from the first reference value; the amplifying factor of the amplifying means being controlled according to the output from the first comparing means or the second comparing means.

According to the reader of the present invention, since the amplifying factor is decreased at a large ambient light level and decreased at a small ambient light level, the ambient light level signal and the slice level signal can be varied to a value suitable to a circuit so that the light source can be lighted at a desired time. Moreover there is in that the light source can be lighted only at a necessary time, the durability of the light source can be improved and the system maintenance cost can be greatly reduced.

Furthermore, according to the present invention, the reader which includes a light source and light detecting means, wherein a mark formed on an article is read by operationally irradiating light from the light source onto the article and detecting light reflected on the article using light detecting means, is characterized by ambient light detecting means for detecting light entering from circumferences and outputting an electrical signal corresponding to the light amount thereof; voltage dividing means for dividing the electrical signal output from the amplifying means into a predetermined voltage division ratio; comparing means for comparing the output of the ambient light detecting means with the output of said voltage dividing means and outputting a signal according to the comparison result; light source drive means for performing the lighting control of the light source in accordance with the output signal from the comparing means; and judging means for judging the level of the output from the ambient light detecting means and then outputting a control signal to control the voltage division ratio of the voltage dividing means, according to the judging result.

The reader of the present invention can vary the slice level signal to a suitable value and can detect stably an ambient light change without depending on the change width of an ambient light level. Moreover there is an advantage in that since the light source can be lighted only at a necessary time, the durability of alight source can be improved so that the system maintenance cost can be remarkably reduced.

According to the present invention, the reader which includes a light source and light detecting means, wherein a mark formed on an article is read by operationally irradiating light from the light source onto the article and detecting light reflected on the article using light detecting means, is characterized by ambient light detecting means for detecting light entering from circumferences and outputting an electrical signal corresponding to the light amount thereof; signal producing means for outputting a slice level signal; comparing means for comparing the electrical signal with the slice level signal and outputting a signal according to the result; light source drive means for performing the lighting control of the light source in accordance with the signal output from the comparing means; and time measuring means for starting time measurement by turning on the power source and then outputting a control signal after a lapse of a predetermined period of time, the time measuring means being reset in accordance with a comparison result from the comparing means; the control signal being sent to the signal producing means to control the level of the slice level signal when the time measuring means detects the predetermined period of time.

Hence, according to the present invention, even if a small change in ambient light due to no bar-code reading operation occurs, the reader can control the comparing means not to detect a change in ambient light, without troubling the lighting of the light source in a reading operation. That is, there is an advantage in that a change in ambient light due to a bar-code reading operation can be distinguished from a change in ambient light due to other causes so that a change in ambient light can be detected stably.

When a bar-code reading, for example, is not performed for a long time, it is possible to prevent an ambient light change erroneous detection due to a cause other than the bar-code reading operation as well as unnecessary lighting of a light source. That is, there is an advantage in that the reader can suppress power consumption, improve the durability of alight source, and greatly reduce the system maintenance cost.

Furthermore, according to the present invention, the reader which includes a light source and light detecting means, wherein a mark formed on an article is read by operationally irradiating light from the light source onto the article and detecting light reflected on the article using light detecting means, is characterized by ambient light detecting means for detecting light entering from circumferences and outputting an electrical signal corresponding to the light amount thereof; control means for outputting a predetermined slice level signal; comparing means for comparing the electrical signal with the slice level signal and outputting a control signal according to the result; light source drive means for performing the lighting control of the light source in accordance with the control signal; and switching means for switching the operational status of the control means; the control means storing the level of an electrical signal from the ambient light detecting means when the switching means switches an operational status; the control means creating a slice level signal according to the electrical signal level stored.

In this case, the reader is characterized by further including analog to digital converting means for converting an output signal from the ambient light detecting device into a digital signal and then outputting the result to the control means, and digital to analog converting means for converting a digital slice level signal sent from the control means into an analog slice level signal and then outputting the result to the comparing means; the control means storing an electrical signal from the ambient light detecting means in the form of a digital signal and producing a slice level signal in the form of a digital signal.

Hence, according to the reader of the present invention, a change in ambient light can be detected using a preset slice level signal or a created slice level signal according to the operation of the switching means. Particularly, a change in ambient light level can be detected even in the case of a small change in ambient light amount due to causes other than the bar-code reading operation. Hence there is an advantage in that the durability of a light source can be improved so that the system maintenance cost can be reduced greatly.

According to the present invention, the reader which includes a light source and light detecting means, wherein a mark formed on an article is read by operationally irradiating light from the light source onto said article and detecting light reflected on said article using light detecting means, is characterized by ambient light detecting means for detecting light entering from circumferences and outputting an analog electrical signal corresponding to the light amount thereof; analog to digital converting means for converting the analog electrical signal from the ambient light detecting device into a digital signal; control means for comparing the digital signal with a reference value and then outputting a control signal according to the result thereof; and light source drive means for performing lighting control of the light source according to the control signal from the control means; the control means investigating the level of a digital signal and then outputting a switch signal to switch the range of the analog to digital converting means when the digital signal is larger than the predetermined upper limit value or smaller than the predetermined lower limit value.

Therefore, according to the reader of the present invention, since the ambient light level signal and the slice level signal can be varied to a suitable value according to the variation width of ambient light level, a change in ambient light level can be stably detected, like the above-mentioned case. Moreover, there is an advantage in that since the control means can perform the process ranging the ambient light change detection to the light source control by one operation, the system configuration can be simplified.

Moreover, according to the present invention, the reader which includes a light source and light detecting means, wherein a mark formed on an article is read by operationally irradiating light from the light source onto the article and detecting light reflected on the article using light detecting means, is characterized by plural ambient light detecting means each for detecting light entering from circumferences and outputting an electrical signal of a different level; switching means connected to each of the plural ambient light detecting means, for validating the operation of one of the plural ambient light detecting means; and control means for comparing an electrical signal output from one in operation among the plural ambient light detecting means with a predetermined reference value and outputting a control signal according to the comparison result; and light source drive means for performing the lighting control of the light source according to the control signal from the control means; the control means further comparing the electrical signal with the predetermined upper limit value and the predetermined lower limit value, outputting a control signal to control the on/off operation of the switch according to the result, thus selecting the ambient light detecting means to be operated.

Therefore, the reader according to the present invention can vary the ambient light level signal and the slice level signal to a value suitable to a circuit, thus detecting stably a change in ambient light level, like the above-mentioned case. Moreover, there is an advantage in that since plural ambient light detecting means each which outputs an electrical signal of a different level can vary substantially the amplifying factor of the ambient light level signal, it is unnecessary to control the amplifying factor of the amplifying means so that the system design is simplified.

BRIEF DESCRIPTION OF THE DRAWINGS

FIG. 18 is a diagram illustrating the operation of the light source lighting controlling device according to the fourth embodiment of the present invention;

Figure 1:
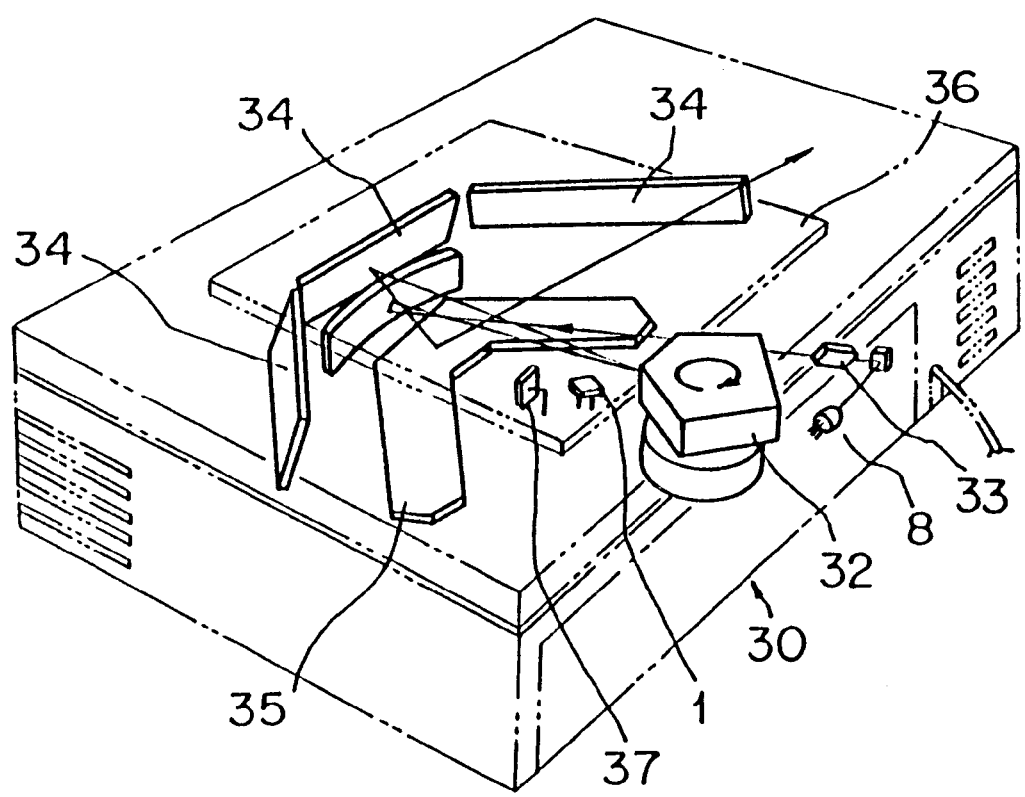
FIG. 1 is a schematic perspective view showing a bar-code reader applied to a light source control device according to each of embodiments of the present invention.

DESCRIPTION OF THE PREFERRED EMBODIMENTS (a) Reader applicable to a light source lighting controlling device according to each of embodiments:

FIG. 1 is a schematic perspective view illustrating a bar-code reader applicable to a light source controlling device according to each of embodiments of the present invention. Referring to the bar-code reader 30 shown in FIG. 1, numeral 8 represents a semiconductor laser (LD) acting as a laser emitting unit (refer to the number 103 shown in FIG. 25), 32 represents a polygon mirror, and 33 to 35 represent mirrors. The polygon mirror 32 and mirrors 33 to 35 work as the scanning mechanism 104 shown in FIG. 25.

Numeral 1 represents an external light detector acting as ambient light detecting means 1 that detects light irradiating from the circumferences and then outputs an electrical signal of, for example, an analog value corresponding to the light amount thereof. As described later in respective embodiments, the semiconductor laser 8 is controlled in its lighting according to the detection information from the external light detector 1.

In the above-mentioned configuration, the semiconductor laser 8 is controlled according to the detection information output from the external light detector 1 to emit a laser beam. The laser beam emitted from the semiconductor laser 8 falls onto the polygon mirror 32 via the mirror 33. The polygon mirror 32 is rotated in the arrow direction with a motor (not shown) to scan the laser beam.

The mirrors 33 to 35 split the laser beam scanned with polygon mirror 32 into plural scanning beams and then externally send off them out of the reading window 36. Thus the laser beam externally emitted reflects on the bar-code and then falls onto the light receiving element 37 via the mirrors 35 and 34.

Figure 25:
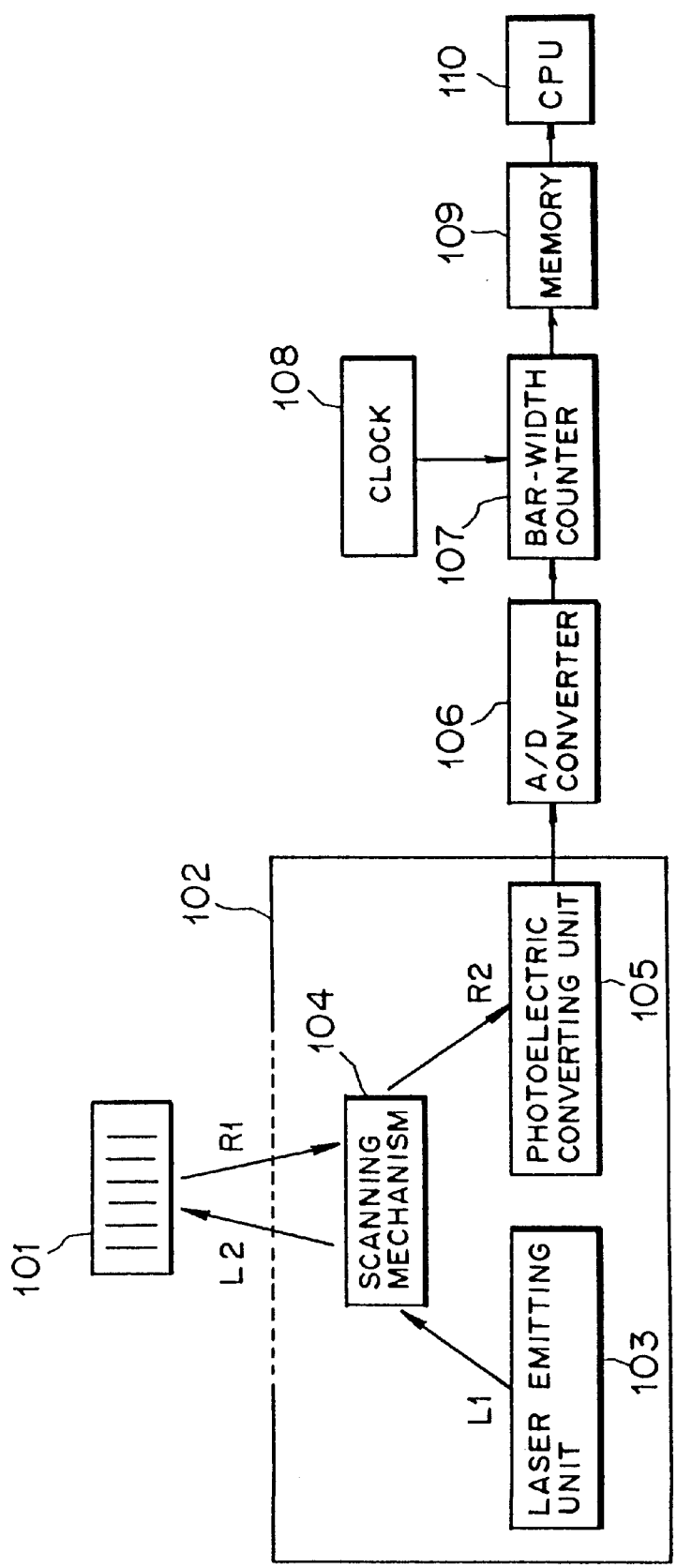
FIG. 25 is a block diagram used for explaining the configuration of a general bar-code reader.
Figure 26:
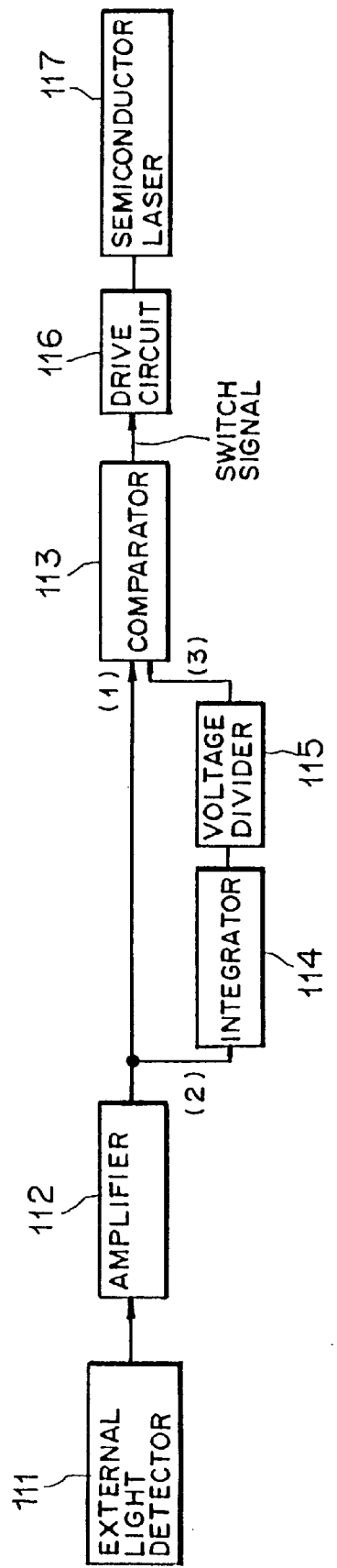
FIG. 26 is a block diagram illustrating a prior art light source lighting controlling device.
Figure 27:
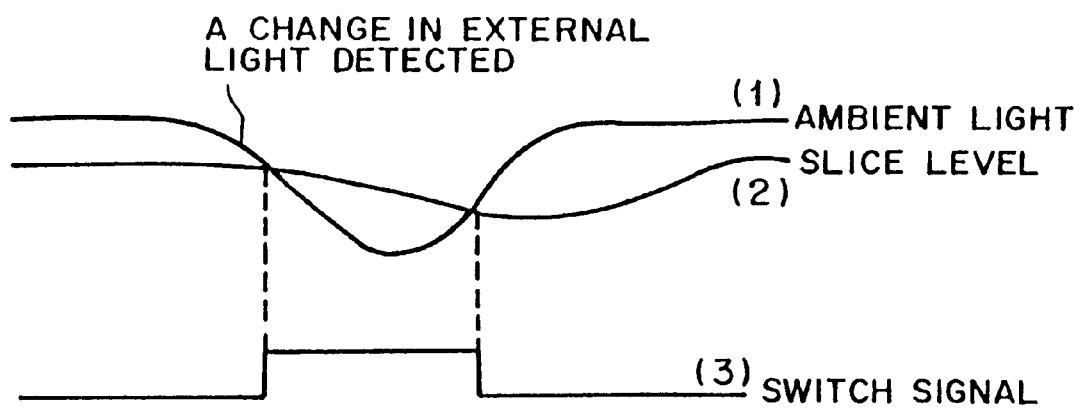
FIG. 27 is a diagram used for explaining the operation of the prior art light source lighting controlling device.
Figure 28A:
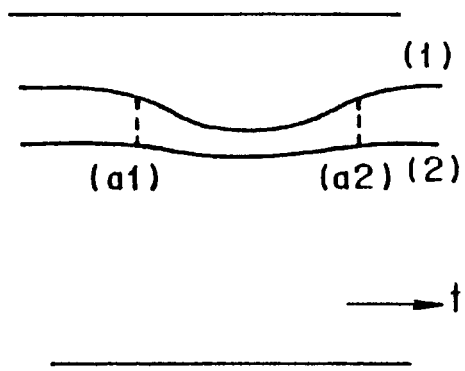
FIGS. 28(a) to 28(c) are diagrams each used for explaining the operation of the prior art light source lighting controlling device.
Figure 28B:
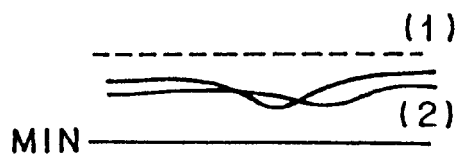
Figure 28C:
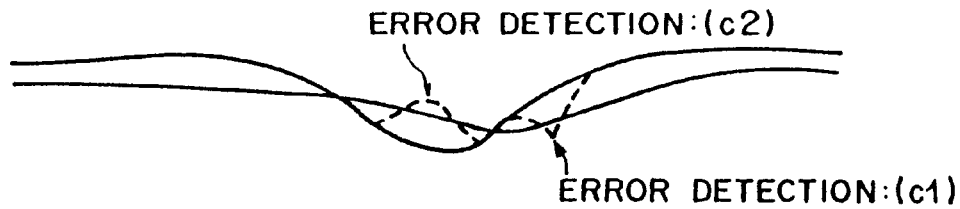

Thereafter, in the manner similar to that shown in FIG. 25, the light signal irradiated to the light receiving element 36 is converted into an electrical signal and then subjected to a signal process such as a binary process.

Figure 2:
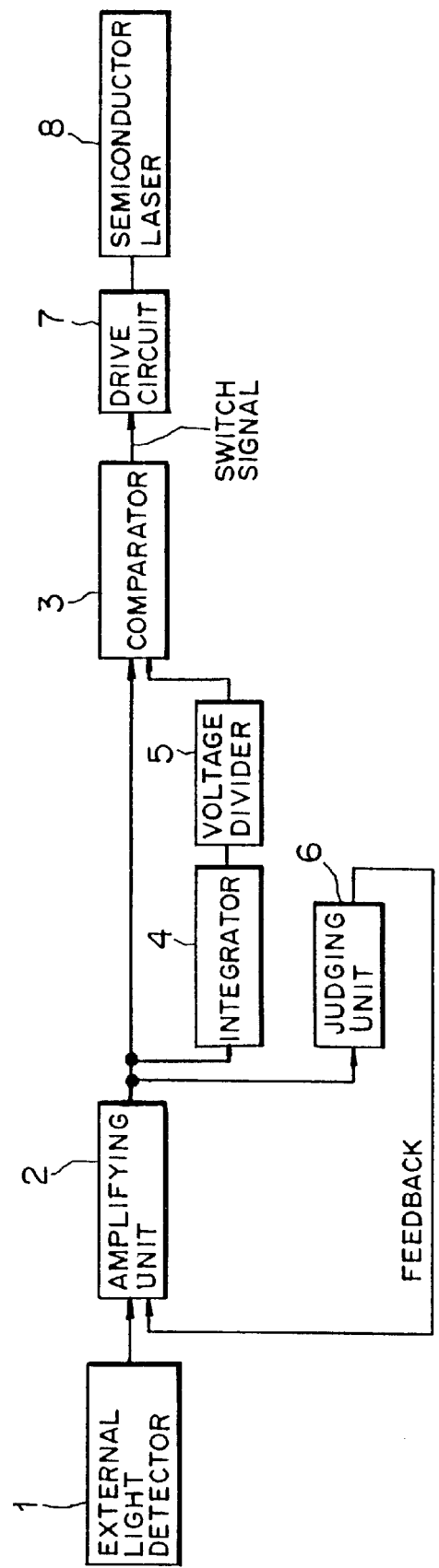
FIG. 2 is a block diagram showing a light source lighting controlling device according to the first embodiment of the present invention.
Figure 3:
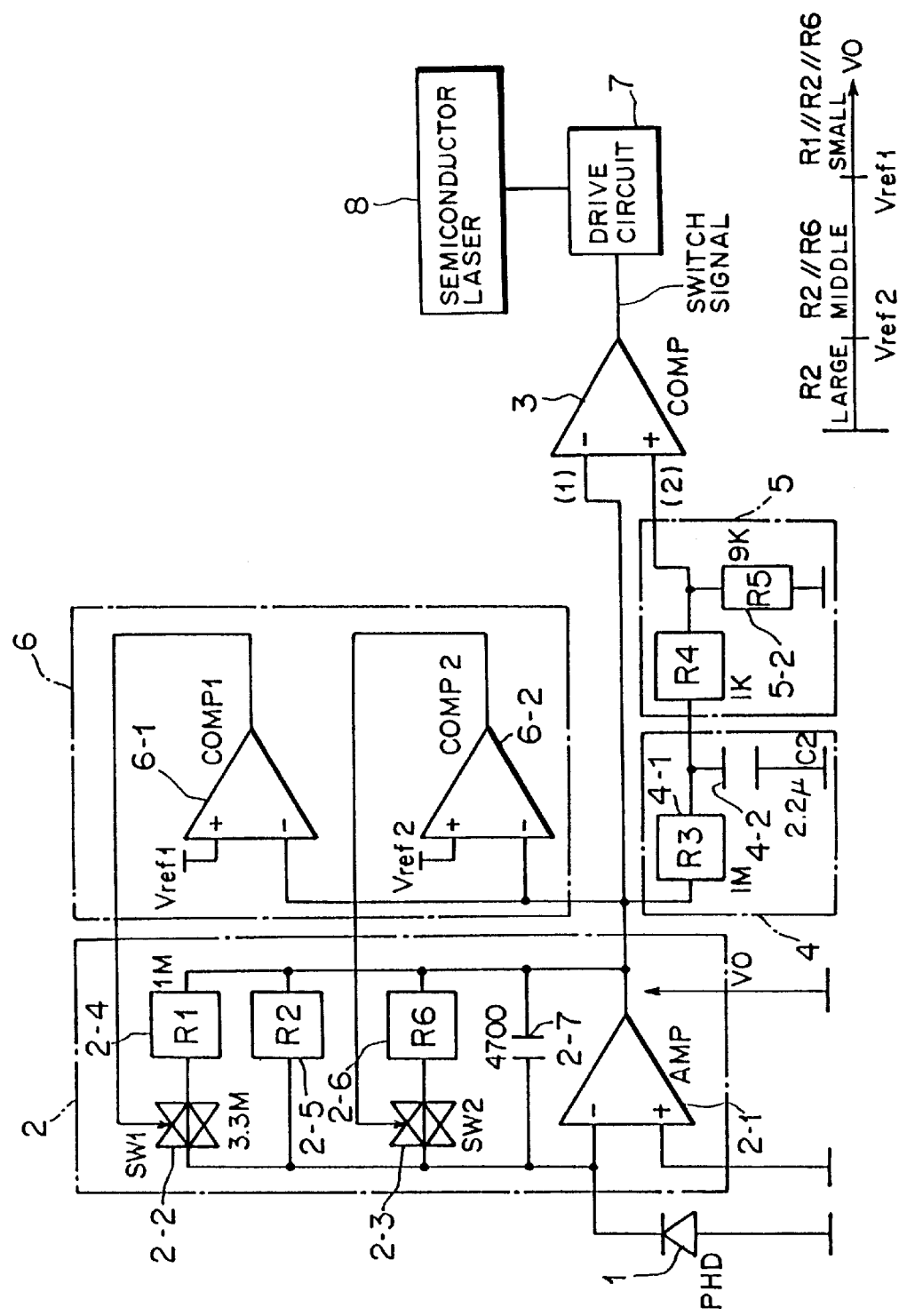
FIG. 3 is a block diagram showing a light source lighting controlling device according to the first embodiment of the present invention.

(b) First embodiment:

FIGS. 2 and 3 are block diagrams each illustrating a light source lighting controlling device according to the first embodiment of the present invention. The bar-code reader shown in FIG. 1 is applicable to the light source lighting controlling device shown in FIGS. 2 and 3. In FIGS. 2 and 3, the same numerals as those shown in FIG. 1 represent the same elements.

Referring to FIGS. 2 and 3, numeral 1 represents an external detector. The external detector 1 functions as ambient light detecting means which detects ambient light irradiating from the circumferences and then outputs an electrical signal (e.g. an analog voltage signal) corresponding to the light amount thereof. In detail, the external light detector 1 is formed of, for example, a photo diode (PHD).

Numeral 2 represents an amplifying unit. The amplifying unit 2 acts as amplifying means which amplifies an electrical signal output from the external light detector 1. In detail, the amplifying unit 2 consists of an amplifier (AMP) 2-1, switches (SW1, SW2) 2-2 and 2-3, resistors (R1, R2 and R6) 2-4 to 2-6, and a capacitor 2-7.

The resistors 2-4 to 2-6 and the capacitor 2-7 are connected in parallel to the amplifier 2-1. The switch 2-2 is connected to the resistor 2-4 and the switch 2-3 is connected to the resistor 2-6. This configuration controls the on/off operation of the switches 2-2 and 2-3 to vary the resistance value connected to the amplifier 2-1, thus varying the output voltage V0 of the amplifier 2. As a result, the amplifying factor can be varied.

In this case, for example, the resistor 2-4 is 1MΩ, the resistor 2-5 is 3.3MΩ, and the resistor is 4700Ω.

Numeral 4 represents an integrator which slopes the waveform of an ambient light level signal output from the amplifier 2. In detail, the integrator 4 includes the resistor (R3) 4-1 and the capacitor (C2) 4-2.

Numeral 5 represents a voltage divider. The voltage divider 5 acts as signal generating means which generates a slice level signal based on the output of the amplifying unit 2. In concrete, the voltage divider 5 divides the voltage of the ambient light level signal from the integrator 4 to output the slice level signal. In detail, the voltage divider 5 is formed of two resistors (R4, R5) 5-1 and 5-2.

In this case, for example, the resistor 5-1 is set to 1kΩ and the resistor 5-2 is set to 9kΩ. The voltage divider 5 can divide the ambient level signal to 90% and then outputs the resultant voltage as a slice level signal.

Numeral 3 represents a comparator (COMP). The comparator 3 functions as comparing means which compares the output from the amplifying unit 2 with the slice level signal from the voltage divider 5. In concrete, the comparator 3 compares the output (1) from the amplifying unit 2 with the output (2) from the voltage divider 5 to compare the ambient light level signal with the slice level signal and then outputs the signal corresponding to the comparison result to the drive circuit 7 (to be described).

The drive circuit 7 acts as a light source drive circuit which controls the lighting state of the semiconductor laser 8 according to the output signal from the comparator 3. In concrete, the drive circuit 7 receives a signal (switch signal) representing a comparison result from the comparator 3. When the slice level signal acting as an output signal from the voltage divider 5 is larger than the ambient light level signal acting as an output signal from the amplifying unit 2, the drive circuit 7 judges that an operator is reading a bar-code based on the switch signal and then controls to drive and light on the semiconductor laser 8.

Numeral 6 represents a judging unit. The judging unit 6 acts as judging unit which judges the level of the output of the amplifying unit 2 and outputs a control signal to control the amplifying factor of the amplifying unit 2 according to the judging result.

The judging unit 6, in detail, consists of a comparator (COMP1) 6-1 acting as first comparing means which compares the output of the amplifying unit 2 with the first reference value Vref1, and a comparator (COMP2) 6-2 acting as second comparing means which compares the output of the amplifying unit 2 with the second reference value Vref2 (<Vref1).

Moreover, the comparison result from the comparator 6-1 is output as an on/off control signal to the switch 2-2 in the amplifying unit 2 while the comparison result from the comparator 6-2 is output as an on/off control signal to the switch 2-3 in the amplifying unit 2. Thus the amplifying factor of the amplifying unit 2 can be controlled according to the output of the comparator 6-1 or 6-2.

The light source lighting controlling device with the above-mentioned configuration applied to the bar-code reader according to the first embodiment of the present invention operates as follows:

When the external detector 1 detects an ambient light as an electrical signal corresponding to the light amount thereof, the amplifying unit 2 amplifies the detected signal to a suitable value and then outputs the result as an ambient light level signal V0 (1) to the comparator 3 and the integrator 4.

The integrator 4 slopes the waveform of the ambient light level signal V0 output from the amplifying unit 2 and then outputs the result to the voltage divider 5. The voltage divider 5 divides the voltage of the ambient light level signal from the integrator 4 to a predetermined voltage division ratio (to 9/10 as shown in FIG. 3) and then outputs the result acting as a slice level signal (2) to the comparator 3.

The comparator 3 compares the ambient light level signal (1) input with the slice level signal (2) and then outputs a switch signal representing the lighting control of the semiconductor laser 8 to the drive circuit 7 when the ambient light level signal (1) is less than the slice level signal (2).

The judging unit 6 receives the output from the amplifying unit 2 and the comparator 6-1 compares the same with the reference voltage Vref1 while the comparator 6-2 compares the same with the reference voltage Vref2 (<Vref1).

The reference voltage Vref1 is a value corresponding to the upper limit to be set as a detection level and the reference voltage Vref2 is a value corresponding to the lower limit to be set as a detection level.

When the output signal V0 from the amplifying unit 2 is larger than Vref1 (V0>Vref1), the output from the comparator 6-1 is an "L" level. The analog switch 2-2 is short-circuited (turned on) in response to the "L" level signal.

When the output signal V0 from the amplifying unit 2 is smaller than Vref1 (V0<Vref1), the output from the comparator 6-1 is an "H" level. The analog switch 2-2 is electrically opened (turned off) in response to the "H" level signal.

Similarly, when the output signal V0 from the amplifying unit 2 is larger than Vref1 (V0>Vref2), the output from the comparator 6-2 is an "L" level. The analog switch 2-3 is short-circuited (turned on) in response to the "L" level signal.

When the output signal V0 from the amplifying unit 2 is smaller than Vref2 (V0<Vref2), the output from the comparator 6-2 is an "H" level. The analog switch 2-3 is electrically opened (turned off) in response to the "H" level signal.

In other words, if V0>Vref1 (>Vref2), the comparator 6-1 outputs an "L" level output signal to turn on the analog signal 2-2 while the comparator 6-2 outputs an "L" level output signal to turn on the analog signal 2-3. As a result, since the resistors 2-4 to 2-6 are connected to amplifier 2-1, the amplifying factor of the amplifier 2-1 (amplifying unit 2) can be decreased.

If V0<Vref2 (<Vref1), the comparator 6-1 outputs an "H" level output signal to turn off the analog signal 2-2 while the comparator 6-2 outputs an "H" level output signal to turn off the analog signal 2-3. As a result, since just the resistor 2-5 is connected to amplifier 2-1, the amplifying factor of the amplifier 2-1 (amplifying unit 2) can be increased.

Moreover, if Vref2<Vo (<Vref1), the analog signal 2-1 is turned off while the analog switch 2-3 is turned on. As a result, since the resistors 2-5 and 2-6 are connected to the amplifier 2-1, the amplifying factor of the amplifier 2-1 (amplifying unit 2) is set to the middle value between two values obtained above.

Figures 4A, 4B:
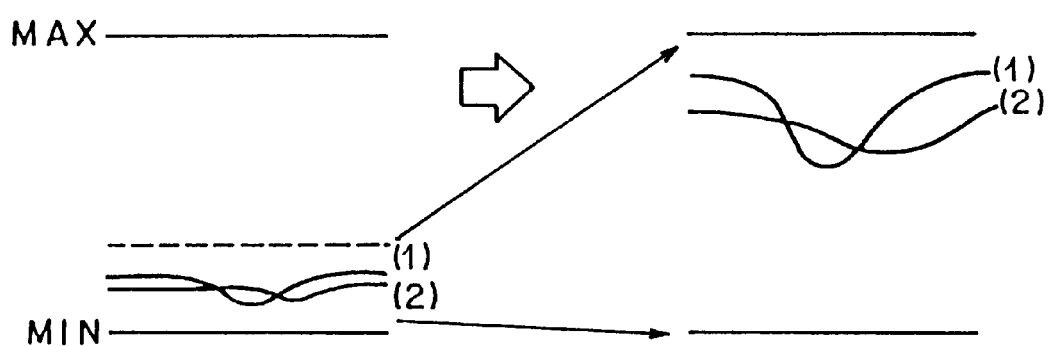
FIGS. 4(a) and 4(b) are diagrams each used for explaining the operation of light source lighting controlling device according to the first embodiment of the present invention.

As shown in FIG. 4(a), when the ambient light level detected by the external light detector 1 is small, the difference between the ambient light level signal and the slice level signal is small. Hence, although noises make it difficult to detect stably the change in ambient light, increasing the amplifying factor of the amplifier 2 allows reducing an influence of noises, whereby the change in ambient light can be stably detected.

In concrete, the judging unit 6 receives the ambient light level signal V0 (1) output from the amplifying unit 2 and then checks the voltage level of the ambient light level signal V0 by comparing it with the predetermined threshold values Vref1 and Vref2.

Thus, when it is judged that the level of the ambient light level signal V0 has the relation of V0<Vref2 (<Vref1) and the ambient light level signal is small, the result is feed-backed to the amplifying unit 2. Thus the amplifying factor of the amplifying unit 2 increases to widen the dynamic range as shown in FIG. 4(b).

That is, the difference between the ambient light level signal (1) and the slice level signal (2) can be widened by expanding the dynamic range as shown in FIG. 4(b). This means that an erroneous operation caused by noises due to disturbance light or noises produced in the detecting circuit can be prevented.

On the other hand, when it is judged that the ambient light level signal V0 output from the amplifying unit 2 has the relation of V0>Vref1 (>Vref2) in the judging unit 6 and the difference exceeds the upper limit to be set, the judging unit 6 feedbacks the judging result to the amplifying unit 2 to decrease the amplifying factor of the amplifying unit 2.

Hence, the ambient light level can be properly detected independently to the ambient light level by controlling the amplifying factor of the amplifying unit 2 according to the detected ambient light level.

As described above, according to the light source lighting controlling device applicable to the bar-code reader according to the first embodiment to the present invention, the judging unit 6 can control the amplifying factor of the amplifying unit 2 according to the comparison result of the ambient light level V0 and the reference voltages Vref1 and Vref2 and decreases the amplifying factor at a larger ambient light level or increases the amplifying factor at a smaller ambient light level. Hence there is an advantage in that the ambient light level signal and the slice level signal can be adjusted to an optimum value to the circuit so that the change in ambient light can be stably detected. Furthermore, since the semiconductor laser 8 can be emitted at a necessary time, the durability of the semiconductor laser 8 can be improved so that the system maintenance cost can be greatly reduced.

In the above-mentioned embodiment, the amplifying factor of the amplifying unit 2 is changed in three stages by controllably switching two analog switches 2-2 and 2-3. However, the present invention should not be limited only to that embodiment. The switching stages, if necessary, can be selected and set desirably.

Figure 5:
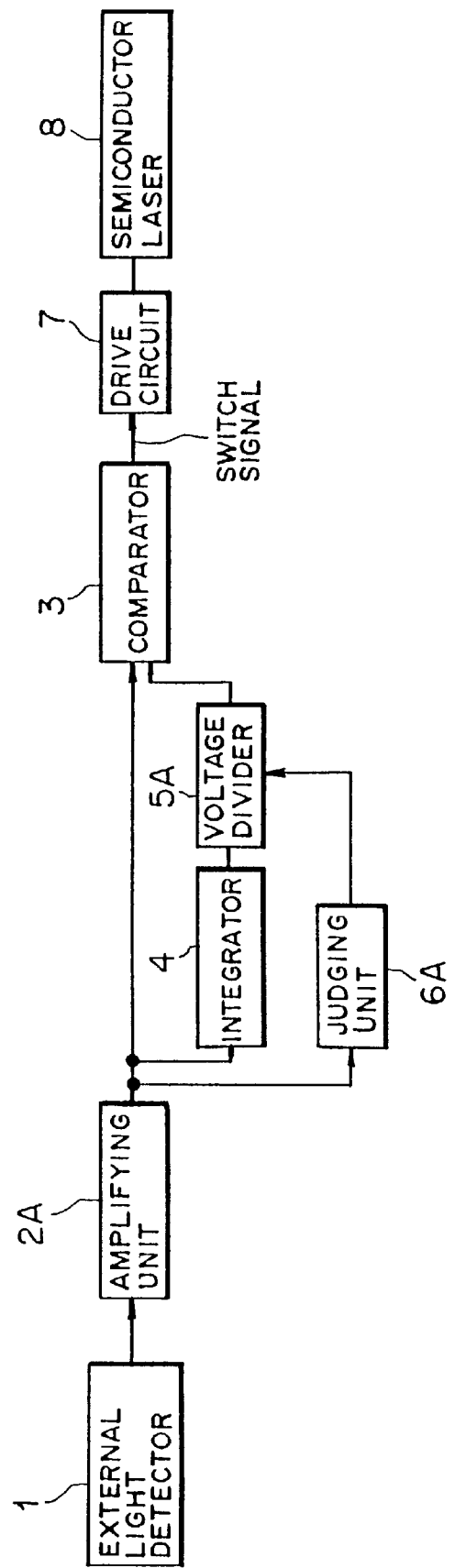
FIG. 5 is a block diagram illustrating a light source lighting controlling device according to the second embodiment of the present invention.
Figure 6:
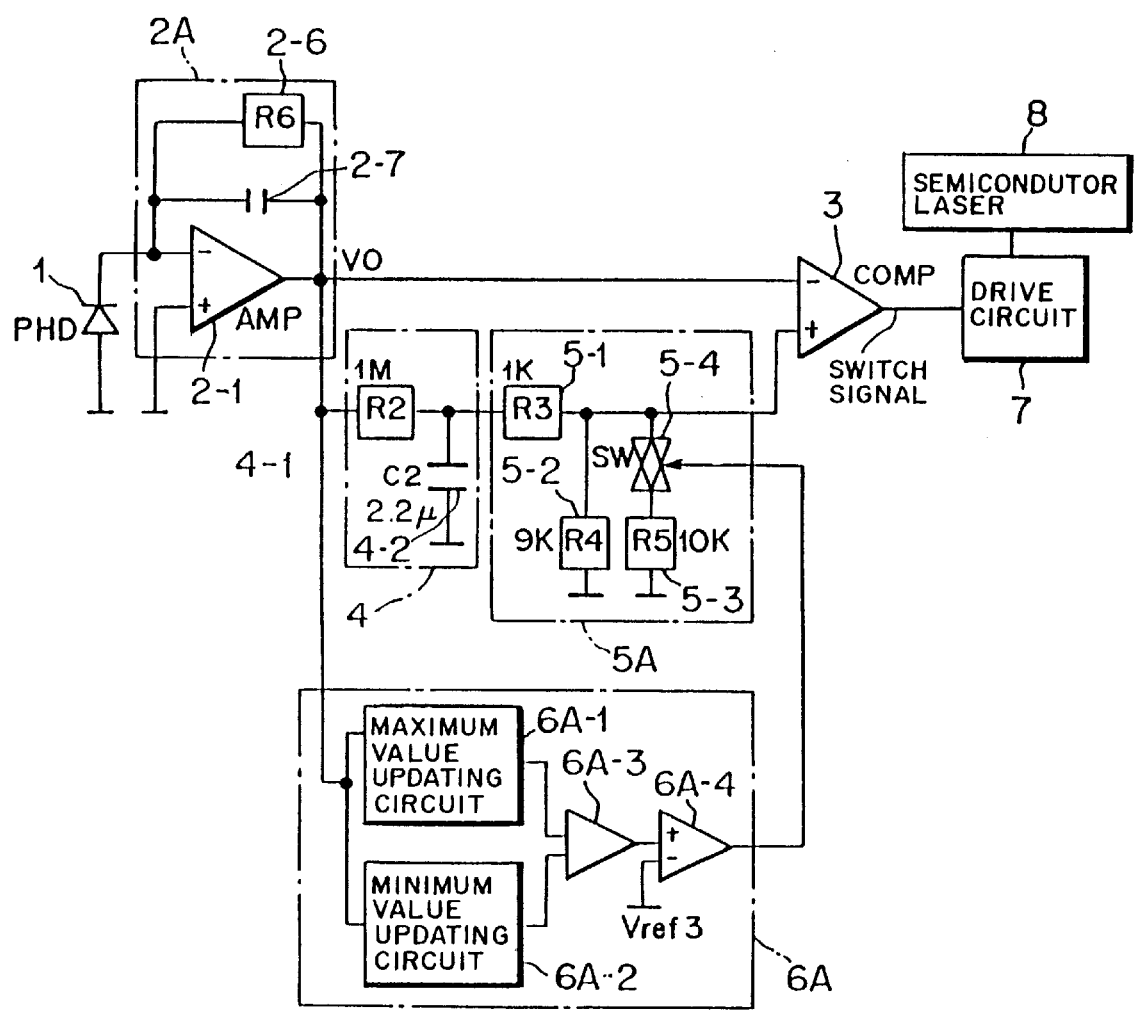
FIG. 6 is a block diagram illustrating a light source lighting controlling device according to the second embodiment of the present invention.

(c) Second embodiment:

FIGS. 5 and 6 are block diagrams each showing a light source lighting controlling device according to the second embodiment of the present invention. Like the first embodiment, the light source lighting controlling device shown in FIG. 5 is applicable to the bar-code reader shown in FIG. 1. In FIGS. 5 and 6, the same numbers as those in FIG. 1 represent the same elements.

The light source lighting controlling device according to the present embodiment differs from that in the first embodiment in the decision aspect of an ambient light level signal from the judging unit 6A. However, the external light detector 1, the integrator 4, the drive circuit 7, and the semiconductor laser 8 are basically similar to those in the first embodiment. In FIGS. 5 and 6, the same numbers as those in FIGS. 2 and 3 represent the same elements.

Hence, likewise the first embodiment, the external detector 1 acts as ambient light detecting means which detects ambient light irradiated from the circumferences and outputs an electrical (e.g. voltage) signal corresponding to the light amount thereof.

Numeral 2A represents an amplifying unit. The amplifying unit 2 amplifies the ambient light level signal detected by the external detector 1 with a predetermined amplifying factor. The amplifying unit 2 includes an amplifier (AMP) 2-1 similar to that in the first embodiment and a resistor (R6) 2-6 and a capacitor 2-7 connected in parallel to the amplifier 2-1.

Moreover, the voltage divider (signal generating means) 5A acts as voltage dividing means which divides the voltage of the output from the external detector 1 in a predetermined voltage ratio to create a slice level signal. Likewise the first embodiment, the voltage divider 5A includes resistors (R3, R4) 5-1 and 5-2, a resistor 5-3 connected in parallel to the resistor 5-2, and an analog switch 5-4 which on/off controls the resistors 5-3.

In other words, the analog switch 5-4 is serially connected to the resistor 5-3 and controls the connection state where the resistor 5-2 is connected to the circuit according to its on state and off state thereof.

For example, the resistor 5-1 is set to 1 kΩ, the resistor 5-2 is set to 9kΩ, and the resistor 5-3 is set to 10kΩ. In this case, when the analog switch 5-4 is turned off, the resistors 5-1 and 5-2 determines the voltage division ratio of the voltage divider 5A, e.g. 83%.

Numeral GA represents a judging unit. The judging unit 6A functions as judging means which judges the output level of the external light detector 1 and then outputs a control signal to control the level of a slice level signal according to the judging result.

In other words, the judging unit 6A receives an ambient light level signal V0 from the amplifying unit 2 and then measures the degree of a change of the ambient light level signal V0, and then corrects the slice level signal according to the degree of the measured change. In detail, the judging unit 6A is formed of a maximum value updating circuit 6A-1, a minimum value updating circuit 6A-2, a differential amplifier 6A-3, and a comparator 6A-4.

The maximum value updating circuit 6A-1 holds the maximum level value of the ambient light level signal V0 from the amplifying unit 2A. The minimum value updating circuit 6A-2 holds the minimum level value of the ambient light level signal V0 from the amplifying unit 2A. The maximum value updating circuit 6A-1, for example, has the configuration as shown in FIG. 7.

Figure 7:
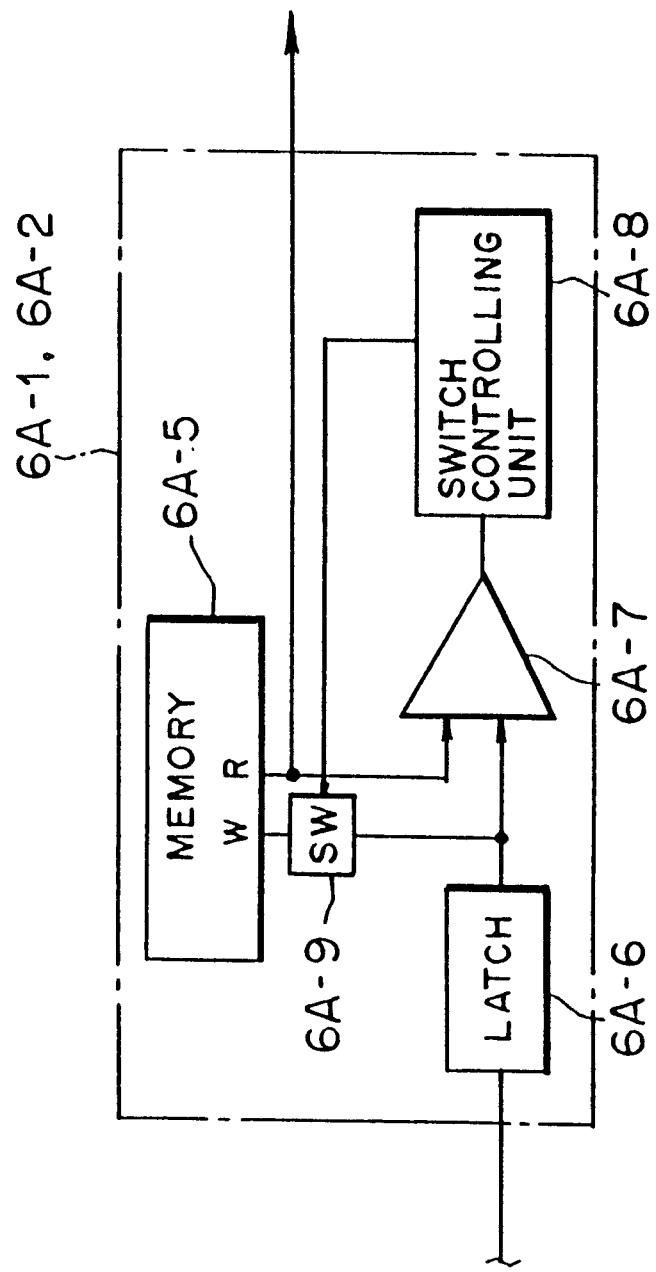
FIG. 7 is a block diagram illustrating the main portion of the second embodiment of the present invention.

Namely, the maximum value updating circuit 6A-1, as shown in FIG. 7, includes a memory 6A-5 which stores the maximum value of an ambient light level signal input from the amplifying unit 2A, a latching circuit 6A-6, a comparator 6A-7, a switch control unit 6A-8, and a switch 6A-9.

The latching circuit 6A-6 latches an ambient light level signal input from the amplifying unit 2A. The comparator 6A-7 compares an ambient light level signal from the latch circuit 6A-9 with the maximum value of an ambient light level signal stored in the memory 6A-5.

Based on the comparison result from the comparator 6A-7, the switch control unit 6A-8 turns off the switch 6A-9 when the level of an ambient light level signal from the latch circuit 6A-6 is smaller than that of the ambient light level signal stored in the memory 6A-5 while it turns on the switch 6A-9 when the level of an ambient light level signal from the latch circuit 6A-6 is larger than that of the ambient light level signal stored in the memory 6A-5.

Hence, when the level of the ambient light level signal from the latch circuit 6A-6 is larger than that of the ambient light level signal stored in the memory 6A-5, the switch 6A-9 is turned off. As a result, the ambient light level signal from the latch circuit 6A-6 is updated as the maximum value of the ambient light level signal and then stored into the memory 6A-5.

The minimum value updating circuit 6A-2 has the configuration similar to that shown in FIG. 7. In this case, when the comparator 6A-7 judges that the level of an ambient light level signal from the latch circuit 6A-6 is larger than that of the ambient light level signal stored in the memory 6A-5, the switch control unit 6A-8 controls to turn on the switch 6A-9 so that the minimum value of the ambient light level signal can be updated and stored into the memory 6A-5.

The differential amplifier 6A-3 in the judging unit 6A operates the differential between the maximum value of an ambient light level signal updated and stored in the maximum value updating circuit 6A-1 and the minimum value of an ambient light level signal updated and stored in the minimum value updating circuit 6A-2.

The comparator 6A-4 compares the differential between the maximum value and the minimum value of an ambient level signal operated by the differential amplifier 6A-3 with a predetermined threshold Vref3; outputs a control signal to turn on the analog switch 5-4 when the differential value is larger than the threshold Vref3 and judges that a change in the control signal is small when the differential value is smaller than the threshold Vref3; and then outputs a control signal to turn off the analog switch 5-4.

In concrete, when the differential value is larger than the threshold value Vref3, the analog switch 5-4 is turned off so that the voltage division ratio becomes 90%. When the differential value is smaller than the threshold value Vref3, the analog switch 5-4 is turned on so that the voltage division ratio becomes about 90%. The analog switch 5-4 receives a decision result output from the judging unit 6A as an on/off control signal to control variably the voltage division ratio of the voltage divider 5A.

The level of a slice level signal output from the voltage divider 5A is determined by the voltage division ratio of the voltage divider 5A. Hence, the set value of the slice level signal can be adjusted by varying the voltage division ratio. Decreasing the voltage division ratio from 90% to 83% means setting the slice level to a lower value.

In the case of a large slice level signal, even if a change in ambient light is small, the comparator 3 detects an ambient light change and outputs a switch signal. That is, the semiconductor laser 8 can be lighted even if a change in ambient light is small.

When the slice level signal is small, provided that a change in ambient light is not so large, the comparator 3 does not detect the ambient light change. If a change in ambient light does not have a value, the comparator 3 does not output any switch signal.

In order to output a switch signal from the comparator 3 according to the degree of a change in ambient light level signal, or to light the semiconductor laser 8, the degree of a desired slice level signal is controlled suitably and selectively.

In the light source lighting controlling device with the above-mentioned configuration applied to the bar-code reader according to the second embodiment of the present invention, when the external light detector 1 detects an electrical signal corresponding to the light amount of an ambient light, the amplifying unit 2A amplifies the detection signal to a suitable value to output the result as an ambient light level signal V0 to the comparator 3 and the integrator 4.

The integrator 4 slopes the waveform of the ambient light level signal V0 from the amplifying unit 2A to output the result to the voltage divider 5A. The voltage divider 5A divides the voltage of the ambient light level signal from the integrator 4 in a voltage division ratio set according to the degree of a change in ambient light level signal and then outputs the result as a slice level signal to the comparator 3.

The comparator 3 compares an ambient light level signal input with a slice level signal and then outputs a switch signal representing a lighting control of the semiconductor laser 8 to the drive circuit 7 when the ambient light level signal is smaller than the slice level signal.

The judging unit 6A operates a differential between the maximum value and the minimum value of an ambient light level signal output from the amplifying unit 2A, or a change in ambient light level, and then compares the operational result with the predetermined threshold Vref3.

When the differential value is larger than the threshold value Vref 3, the voltage division ratio of the voltage divider 5A can be set to about 90% by outputting a control signal which turns off the analog switch 5-4. When the differential value is smaller than the threshold value Vref 3, the voltage division ratio of the voltage divider 5A can be set to about 83% by outputting a control signal which turns on the analog switch 5-4.

Figure 8A:
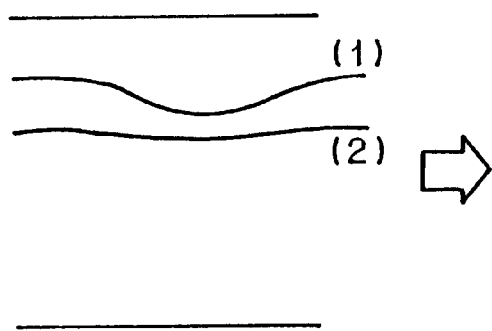
FIGS. 8(a) and 8(b) are diagrams each used for explaining the operation of a light source lighting controlling device according to the second embodiment of the present invention.
Figure 8B:
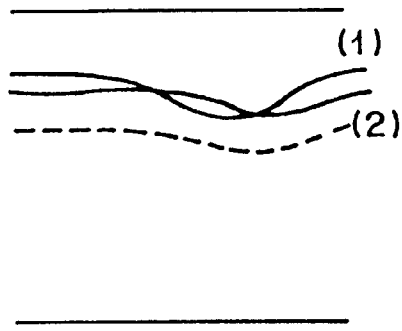

For example, like the ambient light level signal (1) and the slice level signal (2) shown in FIG. 8(*a*), when the level change of ambient light is small, the ambient light level signal does not intersect with the slice level signal so that a change in ambient light cannot be detected.

On the other hand, the judging unit 6A increases controllably the level of an ambient level signal, as shown with the solid line in FIG. 8(*b*), by varying the level of the slice level signal, with the analog switch turned on. Thus, even if the degree of a change in the ambient light level signal (1) is small, the ambient light level signal (1) intersects with the slice level signal (2) and the judging unit 6A, whereby a change in ambient light can be detected.

The broken line shown in FIG. 8(*b*) represents the slice level signal prior to varying the voltage division ratio of the voltage divider 5A.

As described above, according to the light source lighting controlling device applied to the bar-code reader according to the second embodiment of the present invention, the judging unit 6A judges the output level of the external light detector 1, based on the degree of a change in ambient light level signal, and controls the voltage divider 5A according to the judging result, thus adjusting the level of the slice level signal. Thus the slice level signal can be varied to a suitable value according to the variation width of the ambient light level. Hence there is an advantage in that the ambient light change can be stably detected without depending on the variation width of an ambient light level. Moreover, since the semiconductor laser 8 can be turned on only at a necessary time, the service life of the semiconductor laser 8 can be improved so that the system maintenance cost can be reduced drastically.

In the above-mentioned embodiment, the degree of a change in ambient light level signal judged by the judging unit 6A is reflected to the voltage division ratio of the voltage divider 5A so that the level of the slice level signal can be variably controlled. However, the present invention should not be limited only to the present embodiment. The degree of a change in ambient light level signal judged by the judging unit 6A is reflected to the amplifying factor of the amplifying unit. In this case, an amplifier similar to that in the first embodiment may be used as the amplifying unit.

In the present embodiment and the modified embodiment of the present embodiment, the slice level is controllably varied in two steps. However, if necessary, the number of stages of the slice level may be increased and the slice level may be gradually decreased with a lapse of time period.

Figure 9:
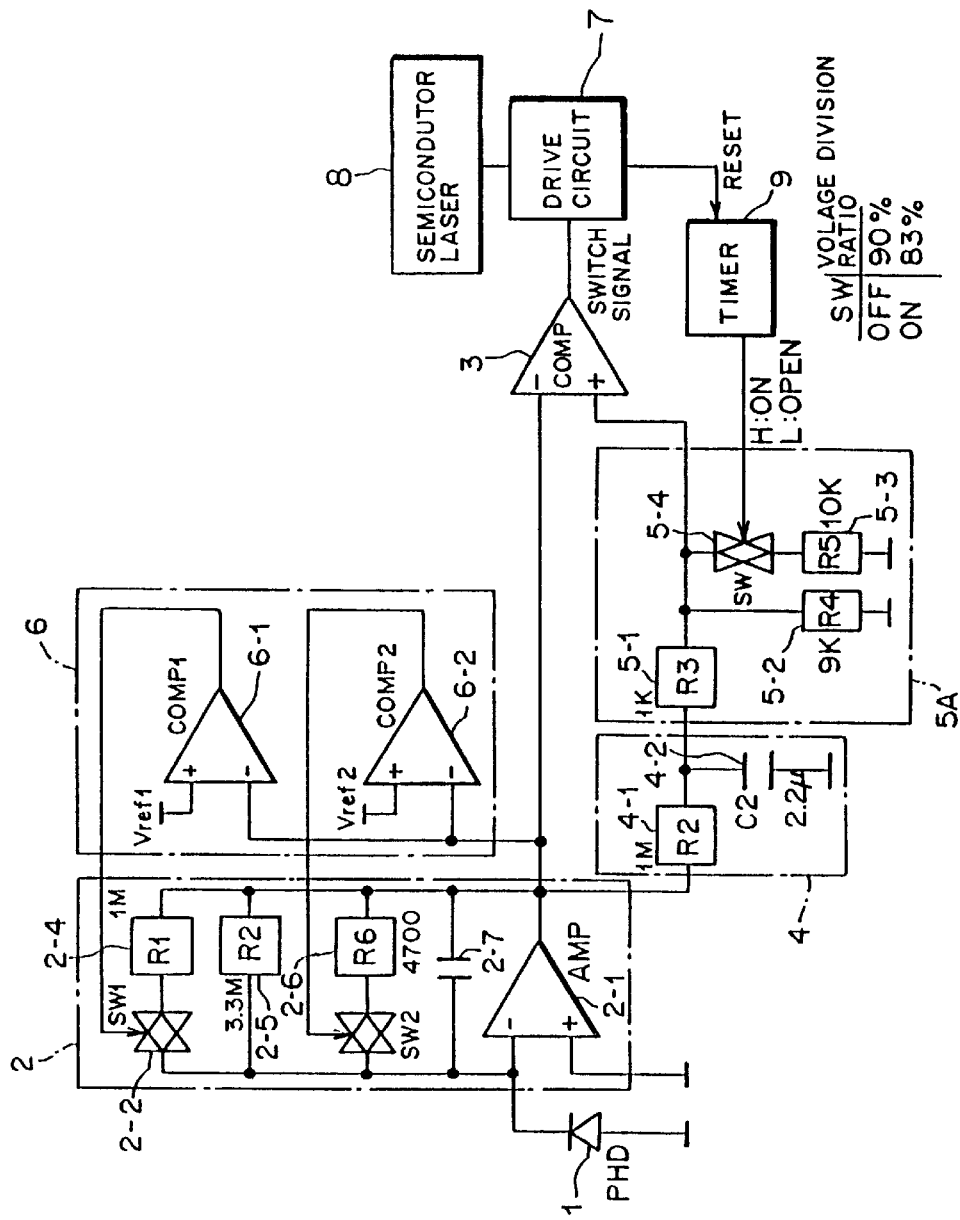
FIG. 9 is a block diagram illustrating a light source controlling device according to the third embodiment of the present invention.

(d) Third embodiment:

FIG. 9 is a block diagram illustrating the light source lighting controlling device according to the third embodiment of the present invention. Like the first and second embodiments, the light source lighting controlling device shown in FIG. 9 is applicable to the bar-code reader shown in FIG. 1. In FIG. 9, the same numerals as those shown in FIG. 1 represent the same elements.

The light source lighting controlling device according to the present embodiment differs from that of the first embodiment in that there are the voltage divider 5A which is similar to that in the second embodiment and the timer 9. Other constituent elements are basically similar to those in the first embodiment. In FIG. 9, the same numerals as those shown in FIGS. 2 and 3 represent the same elements.

The timer (time measuring means) 9 begins a time-measuring operation when the power source is switched on, and then transmits a control signal of "H" level to the voltage divider 5A when a lapse of a predetermined period of time (e.g. t1) is detected according to the measured time. Thus the level of the slice level signal is controlled while the time measurement is reset according to the comparison result of the comparator 3.

In other words, the timer 9 connected to the analog switch 5-4 sends out a control signal to control the on/off state of the analog switch 5-4. When the output of the timer 9 is in an "L" level, the analog switch 5-4 is in an off state. When the output of the timer 9 is in an "H" level, the analog switch 5-4 is in an on state. As a result, the resistor 5-3 is connected to the circuit.

In this case, before a predetermined period of time passes since the power source has been switched on, the timer 9 outputs an "L" level signal to the analog switch 5-4 and then controls it to an off state (open). After a predetermined period of time passes since the power source has been switched on, the timer 9 outputs an "H" level signal to the analog switch 5-4 and then controls it to an on state.

In such a operation, like the second embodiment, the voltage division ratio of the voltage divider 5A can be set to about 90% with the analog switch 5-4 turned off while the voltage division ratio of the voltage divider 5A can be set to about 83% with the analog switch 5-4 turned on.

When the comparator 3 judges that the ambient light level signal is smaller than the slice level signal and an operator is performing a bar-code reading operation, the drive circuit 7 inputs the decision signal as a reset signal to reset the time measurement.

For example, five to ten minutes can be set as a predetermined time being a reference time to output a control signal from the timer 9. If the operator does not execute the bar-code reading operation even after a lapse of 5 to 10 minutes, the slice level signal is lowered. Thus if a small change in ambient light not caused by the bar-code reading operation occurs, it is avoided that the semiconductor laser is lighted on wastefully.

With a large slice level signal and a small change in ambient light, the comparator 3 detects the ambient light change to output a switch signal. Namely, even when a change in ambient light occurs due to causes (e.g. a man's movement around the bar-code reader, lighting on or off illumination) other than the bar-code reading operation, the comparator 3 detects the ambient light, thus lighting the semiconductor laser 8 emits. However, when the bar-code is frequently read out, it is no problem to light on the semiconductor laser 8 in no bar-code reading operation.

However, when the bar-code reading operation is not started after a lapse of a predetermined period from the power source startup time, or an operator is not at the spot, the bar-code reading operation is not performed frequently.

In this case, when the semiconductor laser 8 is in continuous lighting state, waste electric power is consumed and the serviceable life of the semiconductor laser 8 is shortened.

It is considered that the degree of a change in ambient light at the reading operation time of an operator is larger than that due to other causes because the reading operation is made near to the bar-code reader. For that reason, the slice level signal lowered does not affect adversely the lighting of the semiconductor laser 8 in the reading operation.

In this case, even if a small change in ambient light occurs due to some causes other than the reading operation, the comparator 3 does not detect any change in ambient light by decreasing the slice level signal.

Figure 10A:
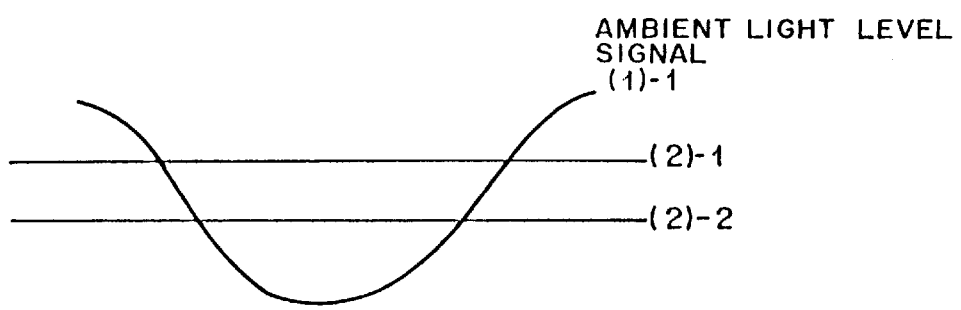
FIGS. 10(a) and 10(b) are diagrams each used for explaining the operation of a light source lighting controlling device according to the third embodiment of the present invention.

For example, in the bar-code reading operation, an ambient light level signal which is detected by the external light detector 1 and input to the comparator 3 via the amplifying unit 2 is shown with the line (1)-1 in FIG. 10(a). In response to the ambient light level signal (1)-1, the comparator 3 can detect a change in ambient light even in the case of the slice level signal (2)-1 in an initial state (prior to lowering the level) or the slice level signal (2)-2 after lowering the level.

Figure 10B:
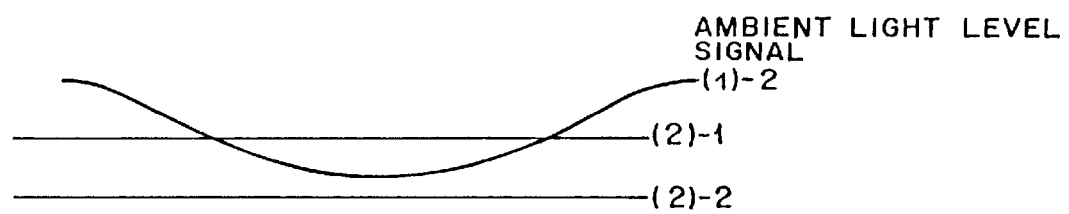

In the case where the ambient light level signal changes due to a factor other than the bar-code reading operation, as shown in (1)-2 in FIG. 10(b), the comparator 3 detects as an ambient light change the slice level signal (2)-1 in an initial state with the ambient light level signal (1)-1. However, the comparator 3 does not detect the slice level signal (2)-2 obtained after the level lowering operation as an ambient light change.

A change in ambient light is not detected by the comparator 3 because of decreasing the slice level signal, whereby the semiconductor laser 8 is not emitted wastefully.

In the light source lighting controlling device with the above-mentioned configuration applied to the bar-code reader according to the third embodiment of the present invention, like the first embodiment, the amplifying unit 2 controls the ambient light level signal, based on the decision information from the judging unit 6. In order to detect ambient light, the comparator 3 compares the ambient light level signal with the slice level signal from the voltage divider 5A.

When the power source for the bar-code reader is switched on, the CPU 10 resets the count value of the timer 9A and the timer 9A starts time-measuring operation. However, as shown with the flowchart in FIG. 11, the slice level signal output from the voltage divider 5A is controlled in level, based on the lapse of period, as shown with the flowchart in FIG. 11.

That is, when the power source for the bar-code reader is switched on, the timer 9 is reset to begin a time-measuring operation. However, an "L" level signal is output as a control signal to the analog switch 5-4 in an initial state before a predetermined time t1 passes (steps A1 to A3).

When the timer 9 outputs a control signal being an "L" level signal, the analog switch 5-4 is turned off. With the resistor 5-3 opened from the circuit, the voltage division ratio of the voltage divider 5-4 is determined by the resistors 5-1 and 5-2 and divides to about 90% (step A2).

The judging unit 6 judges the output level of the amplifying unit 2 according to the ambient light level signal converted into an electrical signal in the external light detector 1 and then controls the amplifying factor of the amplifying unit 2 according to the judging result. Thus the change in ambient light level can be stably detected.

After the power source is switched on, the drive circuit 7 waits for inputting the switch signal as ambient light detection information (information on that the bar-code reading operation is performed) from the comparator 3.

When the comparator 3 does not detect the change in ambient light over the bar-code reading operation (NO route in the step A4 to the step A5 in YES route), the timer 9 outputs an "H" level signal to the analog switch 5-4 to turn it on. Thus, the resistors 5-1 to 5-3 determines the voltage division ratio to about 83% (step A6).

Before or after a lapse of the predetermined period t1 with respect to a power-on time, when the comparator 3 detects that the ambient light level signal is smaller than the slice level signal and an operator performs a bar-code reading operation, the drive circuit 7 drives and emits the semiconductor laser 8 (step A8) and sends a reset signal to the timer 9 to reset the time information of the timer 9 (step A9).

As described above, in the light source lighting controlling device applied to the bar-code reader according to the third embodiment of the present invention, when a lapse of a predetermined period is detected, the timer 9 can transmit a control signal to the analog switch 5-4 in the voltage divider 5A, thus controlling the level of the slice level signal. Even if a small change in ambient light which does not result from the bar-code reading operation should occur, it is possible that the comparator 3 does not detect the ambient light change while the influence of the small change on the semiconductor laser 8 is suppressed in the reading operation. Hence there is an advantage in that the ambient light change due to a bar-code reading operation can be discriminated from the ambient light change due to some causes other than the bar-code reading operation so that the ambient light change can be stably detected. For example, when the bar-code reading is not performed for a long period of time, it can be prevented that an ambient light change due to some factors other than the bar-code reading operation is erroneously detected and the semiconductor laser 8 is emitted wastefully. Hence there is an advantage in that the suppressed electric power consumption and improved durability of the semiconductor laser 8 make it possible to reduce remarkably the system maintenance cost.

Figure 12:
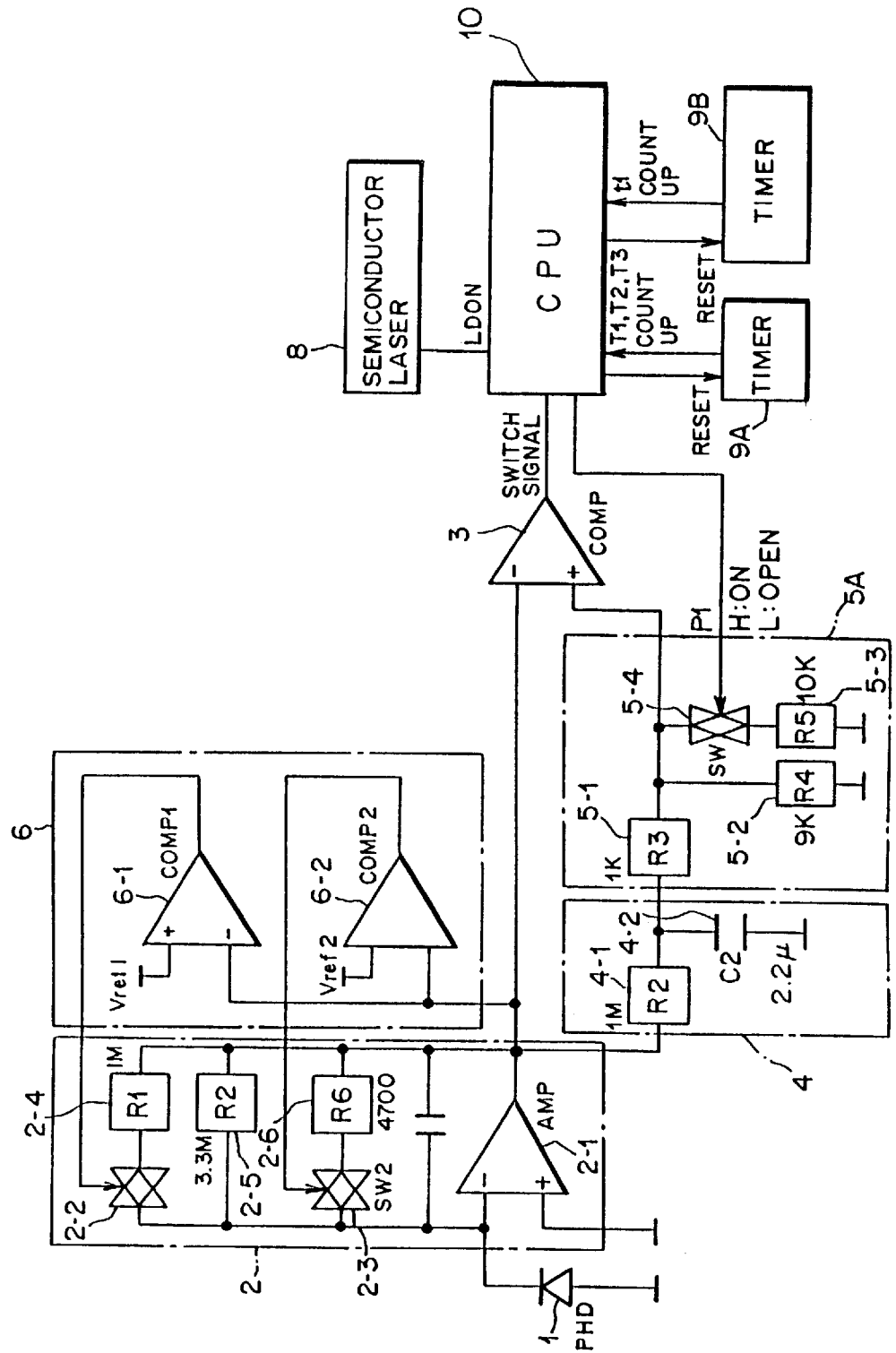
FIG. 12 is a block diagram illustrating a light source lighting controlling device according to a modified example of the third embodiment of the present invention.

(d1) Modified example of third embodiment:

FIG. 12 is a block diagram showing the light source lighting controlling device according to a modified example of the third embodiment of the present invention. The light source lighting controlling device shown in FIG. 12 differs from that of the third embodiment in that the CPU 10 and two timers 9A and 9B are used in place of the driver circuit 7 which drives the semiconductor laser 8 in response to the switch signal from the comparator 3. Other constituent elements are basically similar to those in the third embodiment. In FIG. 12, the same numerals shown in FIG. 9 represent the same elements.

The CPU 10 receives the switch signal from the comparator 3. When an ambient light change in the bar-code reading operation is detected in response to the switch signal, the CPU 10 emits controllably the semiconductor laser 8 and sends a rest signal to the timers 9A and 9B (to be described later).

The timer 9A time-measures the time T1, time T2, and time T3 (T1<T2<T3) to switch the intermittent lighting operation of the semiconductor laser 8 at a power-on time or a start time 0. When the time T1, T2 or T3 has passed, the count-up signal corresponding to the time T1, T2 or T3 is sent to the CPU 10.

Figure 13:
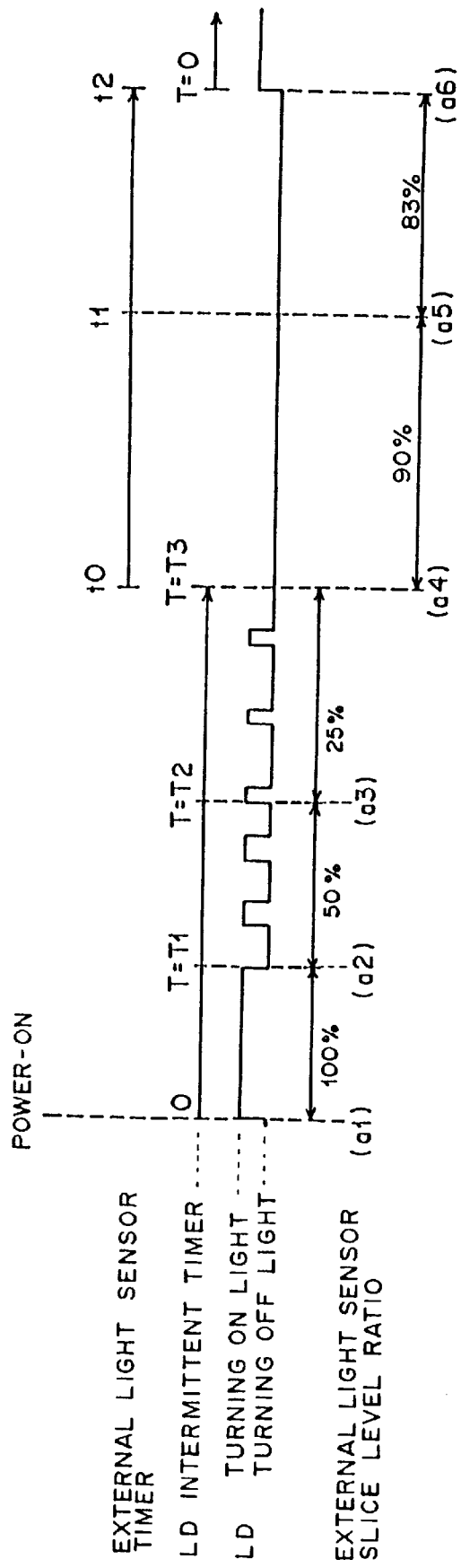
FIG. 13 is a diagram used for explaining the operation of a modified example according to the third embodiment of the present invention.

For example, before the time T1 is passed from the power-on time, the CPU 10 controls the lighting of the semiconductor laser 8 to control the lighting time to full-time ratio to 100% (refer to time (a1) to time (a2) in the timechart shown in FIG. 13).

In response to a count-up signal representing a lapse of the time T1, the CPU 10 subjects the semiconductor laser 8 to an intermittent light control to control the lighting time to full time ratio to 50% (refer to time (a2) to time (a3) in the timechart shown in FIG. 13).

In response to a count-up signal representing a lapse of the time T2, the CPU 10 subjects the semiconductor laser 8 to an intermittent light control to control the lighting time to full time ratio to 25% (refer to time (a3) to time (a4) in the timechart shown in FIG. 13).

Furthermore, in response to a count-up signal representing a lapse of the time T3, the CPU 10 subjects the semiconductor laser 8 to an intermittent light control to control the lighting time to full time ratio to 0% or a light-off state (refer to time (a4) and then on in the timechart shown in FIG. 13).

The timer 9B measures the duration ranging from the time T3 counted by the timer 9A to the time T1 at which the semiconductor laser 8 is turned off. When the timer 9B detects a lapse of the time t1, it outputs a signal representing the progress to the CPU 10.

When the timer 9B does not count the time t1, the CPU 10 outputs an "L" level signal as a control signal to the analog switch 5-4 in the voltage divider 5A. Thus the analog switch 5-4 is turned off to set the voltage division ratio of the voltage divider 5A to 90% (refer to time (a4) to time (a5) in the timechart shown in FIG. 13).

In response to a signal representing a lapse of the time t1 output from the timer 9B, the CPU 10 outputs an "H" level signal as a control signal to the analog switch 5-4 in the voltage divider 5A. Thus the control signal turns on the analog switch 5-4 so that the voltage division ratio of the voltage divider 5A is switched from 90% to 83% (refer to time (a5) to (a6) in the timechart in FIG. 13).

The combination of the CPU 10 and the timers 9A and 9B functions time-measuring means which begins the time-measuring operation when the power source is switched on, and then outputs a control signal after a lapse of a predetermined period, and further is reset according to the comparison result.

In the light source lighting controlling device with the above-mentioned configuration applied to the bar-code reader according to a modified example of the third embodiment of the present invention, like the first embodiment, the amplifying unit 2 controls the ambient light level signal according to the decision information from the judging unit 6. When the comparator 3 compares the ambient light level signal with the slice level signal output from the voltage divider 5A, it detects ambient light and outputs a switch signal to the drive circuit 7 so that the semiconductor laser 8 is controlled in lighting operation.

Figure 14:
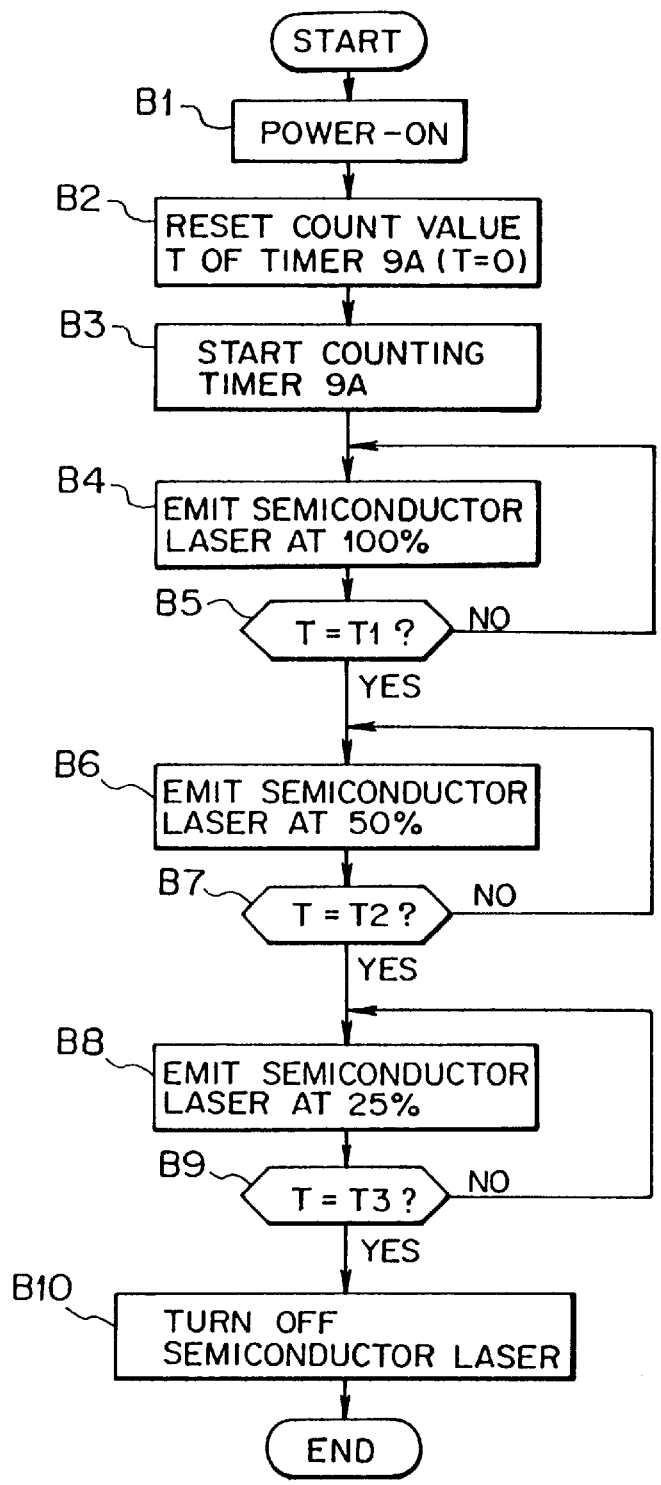
FIG. 14 is a flowchart used for explaining the operation of the light source lighting controlling device according to a modified example of the third embodiment of the present invention.

The CPU 10 emits intermittently the semiconductor laser 8, as shown with the flowchart in FIG. 14.

That is, when the power source for the bar-code reader is switched on (step B1), the CPU 10 resets the count value of the timer 9A (step B2). Then the timer 9A begins the time-measuring operation (step B3).

As shown the time (a1) to (a2) of the timechart shown in FIG. 13, the CPU 10 controls the semiconductor laser 8 to the lighting time to full time ratio of 100% (refer to the closed loop formed in NO route in steps B4 and B5).

When the time T1 has passed based on the lapse time counted by the timer 9A (YES route in step B5), an elapsed time representing signal is output to the CPU 10.

Till the timer 9A detects a lapse of time T2, the CPU 10 controls intermittently the semiconductor laser 8 to the lighting time to full time ratio of 50% (refer to closed loop formed in NO route in steps B6 and B7).

Moreover when the time T2 has passed based on the elapsed time counted by the timer 9A (YES route in step B7), the CPU 10 outputs a signal representing the progress.

Till the timer 9A detects a lapse of time T3, the CPU 10 controls intermittently the semiconductor laser 8 to the lighting time to full time ratio of 25% (refer to closed loop formed in NO route in steps B8 and B9).

When the predetermined time T3 has passed based on the elapsed time measured by the timer 9A (YES route in step B9), the CPU 10 outputs a signal representing the progress.

Thereafter till the detection information (switch signal) regarding an ambient light change in the bar-code reading operation of the comparator 3 is input, the CPU 10 turns off the semiconductor laser 8 (step B10).

Figure 11:
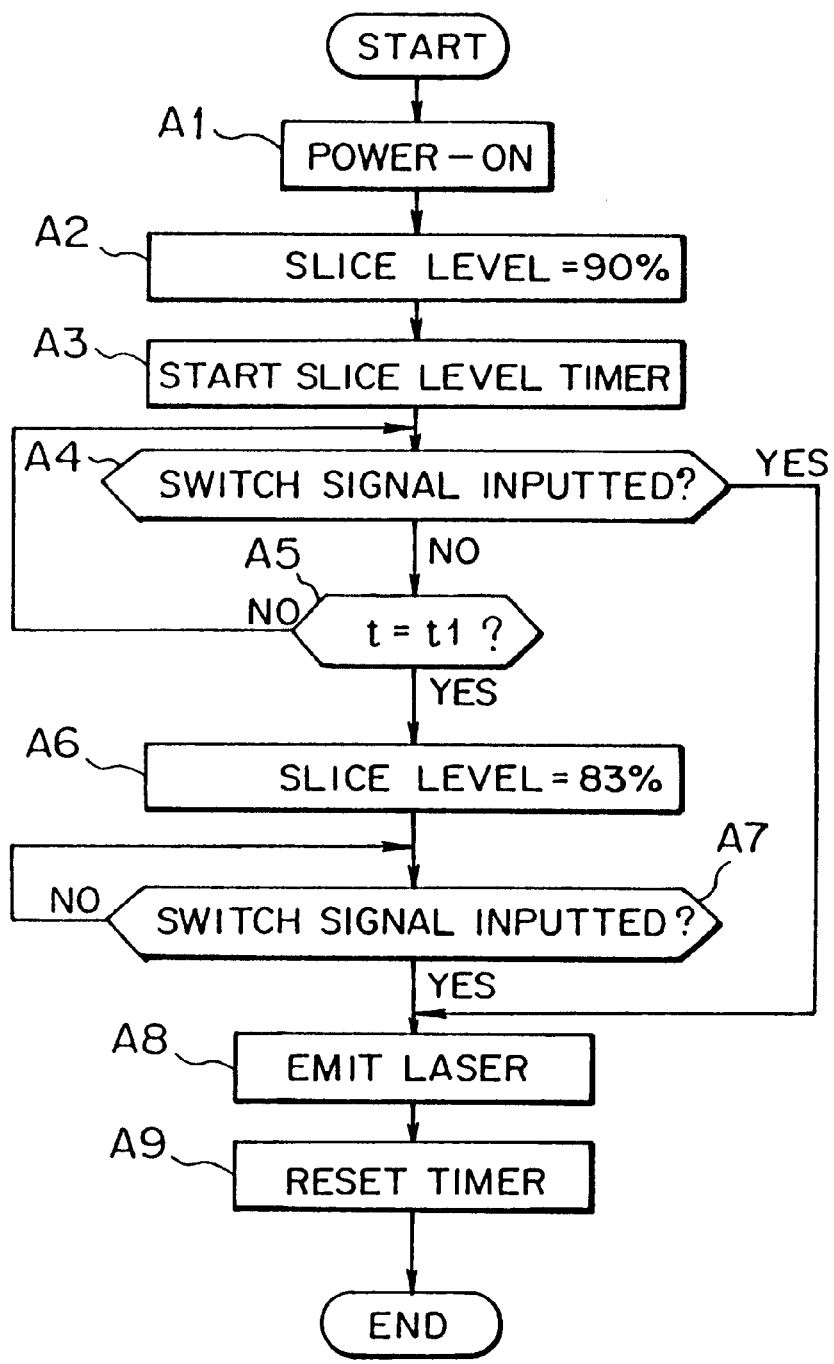
FIG. 11 is a flowchart used for explaining the operation of the light source lighting controlling device according to the third embodiment of the present invention.

Like the third embodiment, the level of the slice level signal output from the voltage divider 5A is controlled (refer to the flowchart shown in FIG. 11).

As described above, in the modified example of the third embodiment of the present invention, the timers 9A and 9B and the CPU 10 can control the level of the slice level signal, whereby the present embodiment can provide an advantage similar to that in the third embodiment. Moreover since the timer 9A and the CPU 10 can control the semiconductor laser 8 to light intermittently according to the elapsed time, the lighting time of the semiconductor laser 8 can be reduced remarkably. Hence there is an advantage in that the durability of the semiconductor laser 8 can be drastically improved.

In the present embodiment and the above-mentioned modified example of the present embodiment, the slice level is changed in two steps. However, if necessary, the number of slice levels can be increased so that the slice level can be gradually decreased with the time elapsed.

Figure 15:
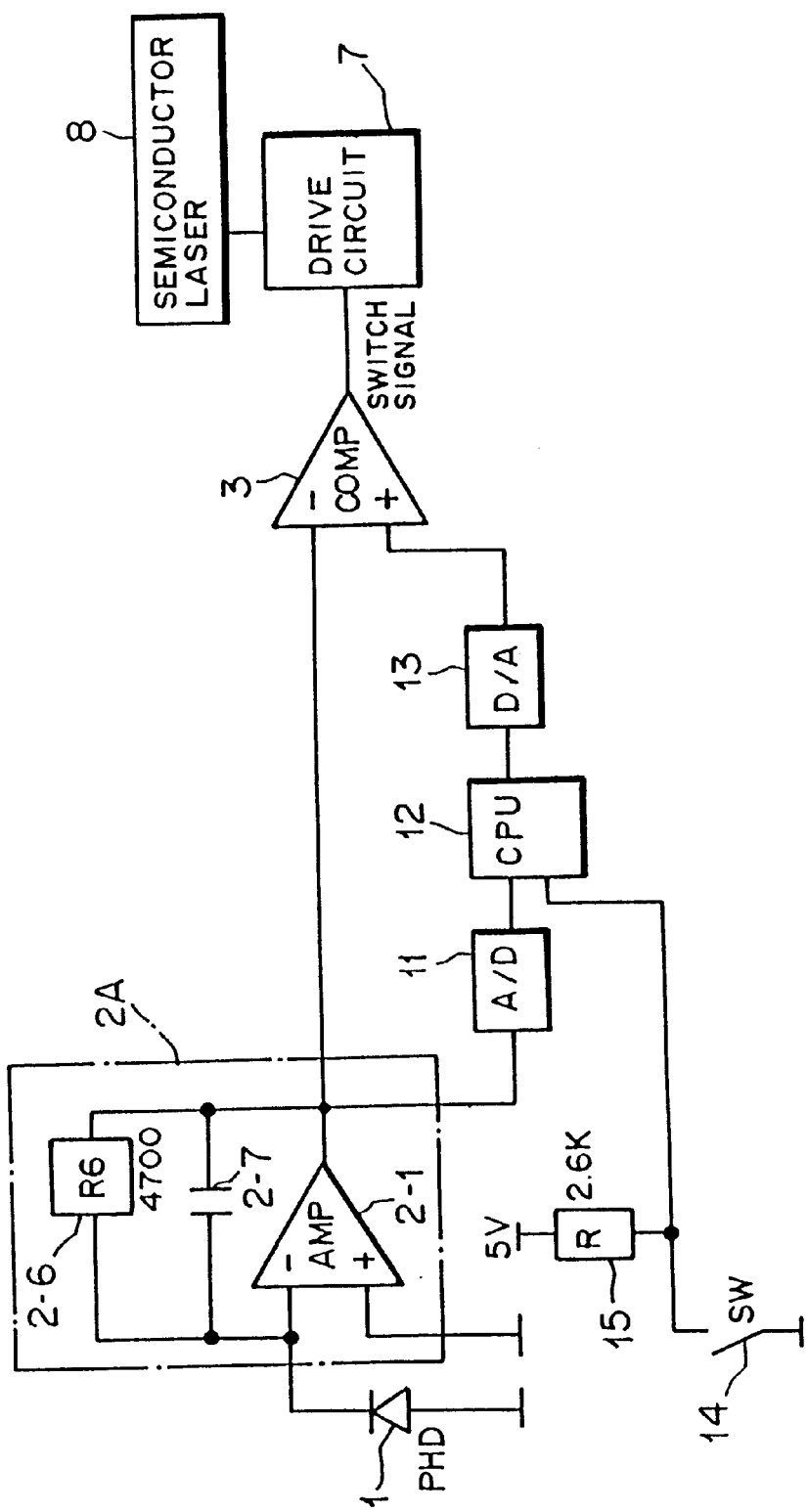
FIG. 15 is a light source lighting controlling device according to the fourth embodiment to the present invention.

(e) Fourth embodiment:

FIG. 15 is a block diagram showing the light source lighting controlling device according to the fourth embodiment of the present invention. Like the already-mentioned embodiments, the light source lighting controlling device shown in FIG. 1 can be applied to the bar-code reader. In FIG. 15, the same numerals as those in FIG. 1 represent the same elements.

The light source lighting controlling device according to the present embodiment differs from the above-mentioned embodiments, in that the slice level signal is set over the operation based on the ambient light level signal. However, the external light detector 1, the amplifying unit 2A, the comparator 3, the drive circuit 7, and the semiconductor laser 8 are similar to those in the second embodiment (refer to FIG. 6). In FIG. 15, the same numerals as those in FIG. 6 represent the same elements.

Referring to FIG. 15, numeral 11 represents an A/D converter. The A/D converter 11 functions as analog to digital converting means that converts an output signal from the external light detector 1 into a digital signal. That is, the A/D converter 11 converts an ambient light level signal (analog signal) from the amplifying unit 2A into a digital signal Numeral 12 represents a CPU (control means). The CPU 12 stores an electrical signal from the external light detector 1 in the form of a digital signal and outputs a slice level signal in the form of a digital signal.

The CPU 12 stores an ambient light level signal being a digital slice level signal preset by an external input or a digital signal input from the A/D converter 11, operates the slice level signal based on the ambient light level signal stored, and then creates the result as a digital slice level signal.

In concrete, the CPU 12 stores, for example, an ambient light level signal being a digital signal input from the A/D converter 11 in a duration; extracts the maximum value and the minimum value of the ambient light level signal; then operates the average value of the maximum value and the minimum value; and finally creates the operational result as a slice level signal.

Figure 17:
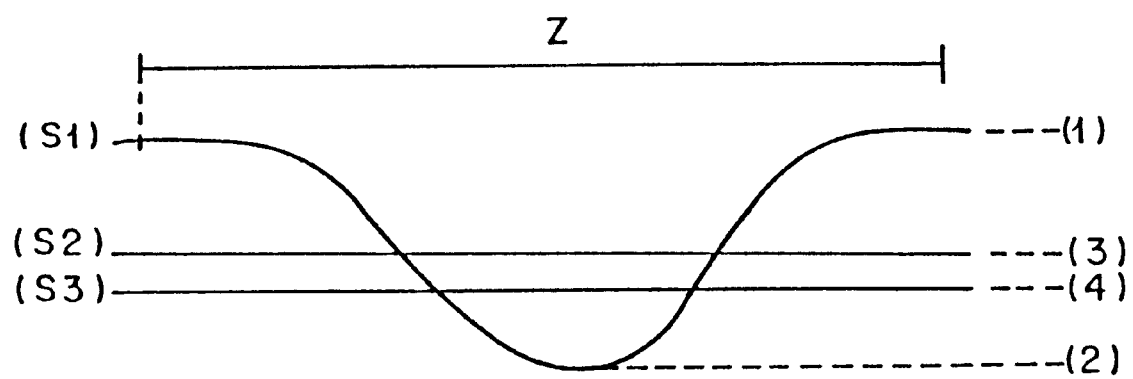
FIG. 17 is a diagram illustrating the operation of the light source lighting controlling device according to the fourth embodiment of the present invention.

For example, when an article is placed over the bar-code reader, the amplifying unit 2A outputs the ambient light level signal, like the signal (S1) shown in FIG. 17. In order to create a slice level signal, the CPU 12 stores an ambient light level signal as a digital signal input to the A/D converter 11 during a certain period (e.g. the duration Z in FIG. 17).

In this case, the ambient light level signal from the A/D converter 11 has a discrete value of the signal (S1) sampled during the period Z shown in FIG. 17.

Consequently, the CPU 12 extracts the maximum value (the level of an ambient light amount when an article is read; refer to (1) and the minimum value (the level of an ambient light amount when an article is not read; refer to (2) of values of stored ambient light level signals. Thereafter, the CPU 12 operates the average value (refer to (2)) of the maximum value and the minimum value and then creates the operational result as a slice level signal (S2).

As to the slice level signal created in the CPU 12, the level in a predetermined ratio of the average value (refer to (4)) can be created as a slice level signal (S3), in addition to the average value of the maximum value and the minimum value.

Numeral 13 represents a D/A converter. The D/A converter 13 acts as digital to analog converting means that converts a digital slice level signal output from the CPU 12 into an analog slice level signal and then outputs it to the comparator 3.

Numeral 14 represents a switch. The switch 14 functions as switching means which switches the operational state of the CPU 12. The switch 14, for example, is formed of a DIP switch or a mode changeover switch by which an operator switches controllably the on/off state.

The resistor (e.g. of 2.6 kΩ) to which 5V is applied is connected between the switch 14 and the CPU 12. When the switch 14 is turned on, a predetermined voltage is applied as a switch signal to the CPU 12.

When the switch 14 in an off state does not output the switch signal to the CPU12, the CPU 12 outputs a preset digital slice level signal which is held therein. When the switch 14 in an on state outputs the switch signal to the CPU 12, the CPU 12 outputs a digital slice level signal operated based on the ambient light level signal from the A/D converter 11, in response to the switch signal acting as a trigger signal.

The light source lighting controlling device with the above-mentioned configuration applied to the bar-code reader according to the fourth embodiment of the present invention operates as follows:

First, when an operator places an article over the bar-code reader, the amplifier 2A amplifies an ambient light level signal detected by the external light detector 1 and then inputs the result to the A/D converter 11 and the comparator 3.

The A/D converter 11 converts an analog ambient light level signal input from the amplifier 2A and then outputs the result to the CPU 12. The CPU 12 creates a slice level signal based on the ambient light level signal from the A/D converter 11 and then outputs it to the comparator 3 via the D/A converter 13.

In order to control the lighting operation of the semiconductor laser 8, the comparator 3 performs an ambient light detection by comparing the ambient light level signal from the amplifier 2A with an analog slice level signal input from the CPU via the D/A converter 13 and then outputting a switch signal to the drive circuit 7.

Figure 16:
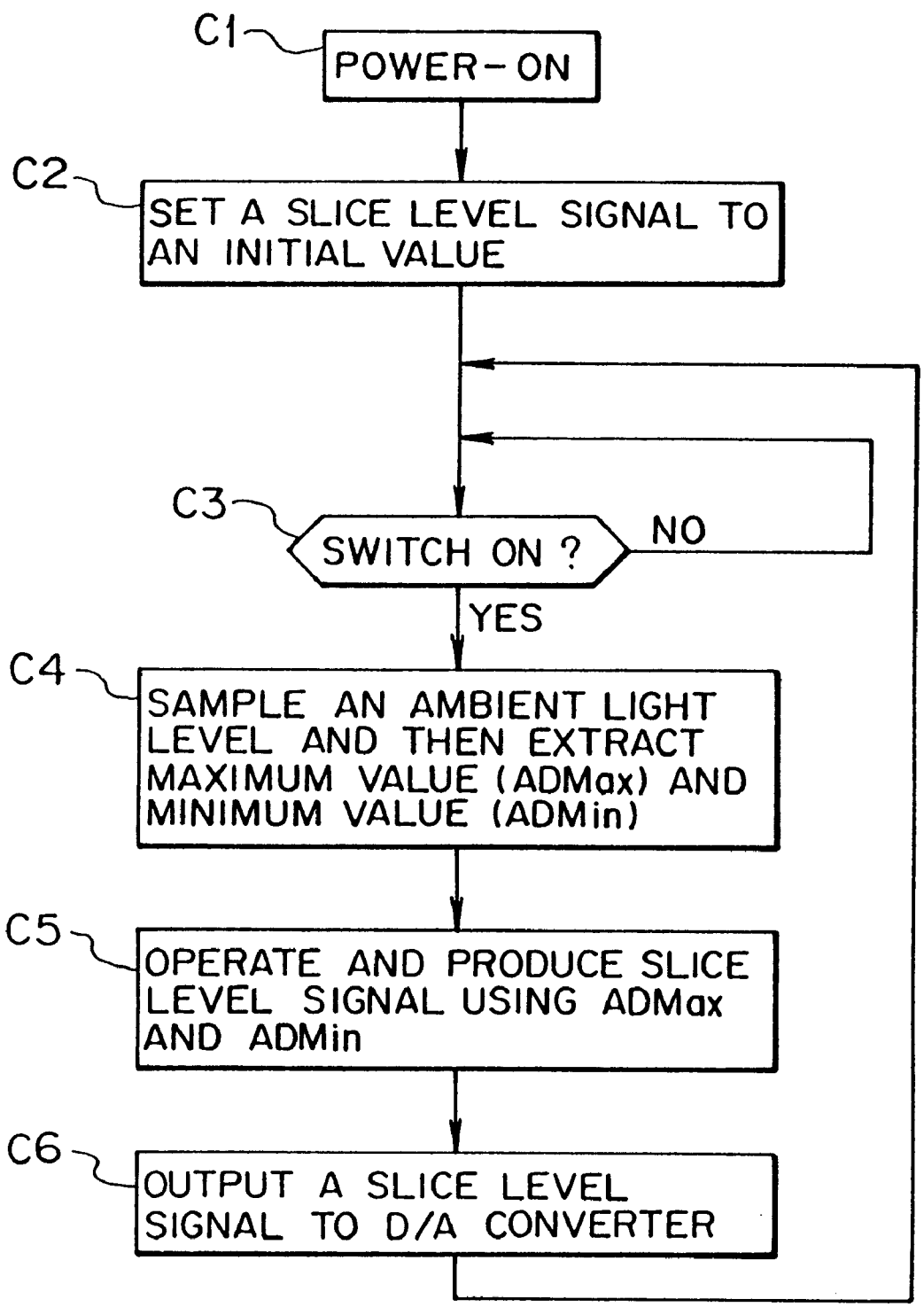
FIG. 16 is a flowchart used for explaining the operation of the light source lighting controlling device according to the fourth embodiment of the present invention.

The slice level signal created by the CPU 12 is set based on the switch signal from the switch 14, as shown in the flowchart in FIG. 16.

That is, after the power source for the bar-code reader is switched on (step C1), the initial value of the slice level signal is preset externally (step C2). Then it is waited that the switch 14 is turned on (step C3).

Till the switch 14 is turned on, the CPU 12 outputs a predetermined slice level signal to the D/A converter 13, without depending on an input ambient light level signal. The comparator 3 detects the ambient light change based on the preset slice level signal.

When the switch 14 is turned on (YES route in step C3), the CPU 12 samples the ambient light level signal using the slice level signal as a trigger signal. In other words, the CPU 12 stores the digital ambient light level signal output from the A/D converter 11 for a predetermined period and then extracts the maximum value (ADMax) and the minimum value (ADMin) of the ambient light level signals stored (step C4).

Sequentially, the CPU 12 operates the average value of the maximum value (ADMax) and the minimum value (ADMin) extracted and then creates as a slice level signal, for example, the operated average value or a level in a predetermined ratio of the average value (step C5).

Thus, the D/A converter 13 receives the slice level signal created and then converts it into an analog signal to output to the comparator 13. The comparator 3 can detect an ambient light change by using the slice level signal created based on the ambient light level signal (step C6).

Thereafter, the CPU 12 outputs without any change as a slice level signal the result created through the above-mentioned operation. However, the switch 14 is again turned on, the ambient light level signal is sampled to create the slice level signal, like the above-mentioned case.

Thus a change in ambient light in the bar-code reading operation is large. For example, as shown in FIG. 18, the comparator 3 outputs a switch signal to the drive circuit 7 by detecting the intersection of the ambient light level signal (S1) and the slice level signal (S2) or (S3), whereby the semiconductor laser 8 can be lighted on.

When an ambient light change occurs due to causes other than the bar-code reading operation and is smaller than that in the bar-code reading operation, the intersection of the ambient light level signal S4 and the slice level signal S2 or S3 is not detected as shown in FIG. 18. In such a case, the semiconductor laser 8 is not lighted on.

According to the light source lighting controlling device applied to the bar-code reader of the fourth embodiment of the present invention, the CPU 12 can create a slice level signal based on the ambient light level signal stored as a digital signal. Hence even when a change in amount of ambient light is small, particularly, due to causes other than the bar-code reading operation, the ambient light level change can be detected so that the semiconductor laser 8 can be lighted on only at a necessary time. There is an advantage in that the durability of the semiconductor laser 8 can be improved and the system maintenance cost can be remarkably reduced.

In the present embodiment, the slice level signal creates based on the average value of the maximum value and the minimum value of a detected ambient light. However, the present invention should not be limited only to the above-mentioned embodiment. For example, the slice level signal can be created using other method, for example, a method of operating only based on the maximum value and the minimum value.

In the present embodiment, when the switch 14 is turned on, the CPU 12 operates a slice level signal based on the input ambient light level signal. However, the present invention should not be limited only to the present embodiment. When the switch 14, for example, is turned on, it is considered that the slice level signal which is set based on a preset voltage level is input to the CPU 12.

Figure 19:
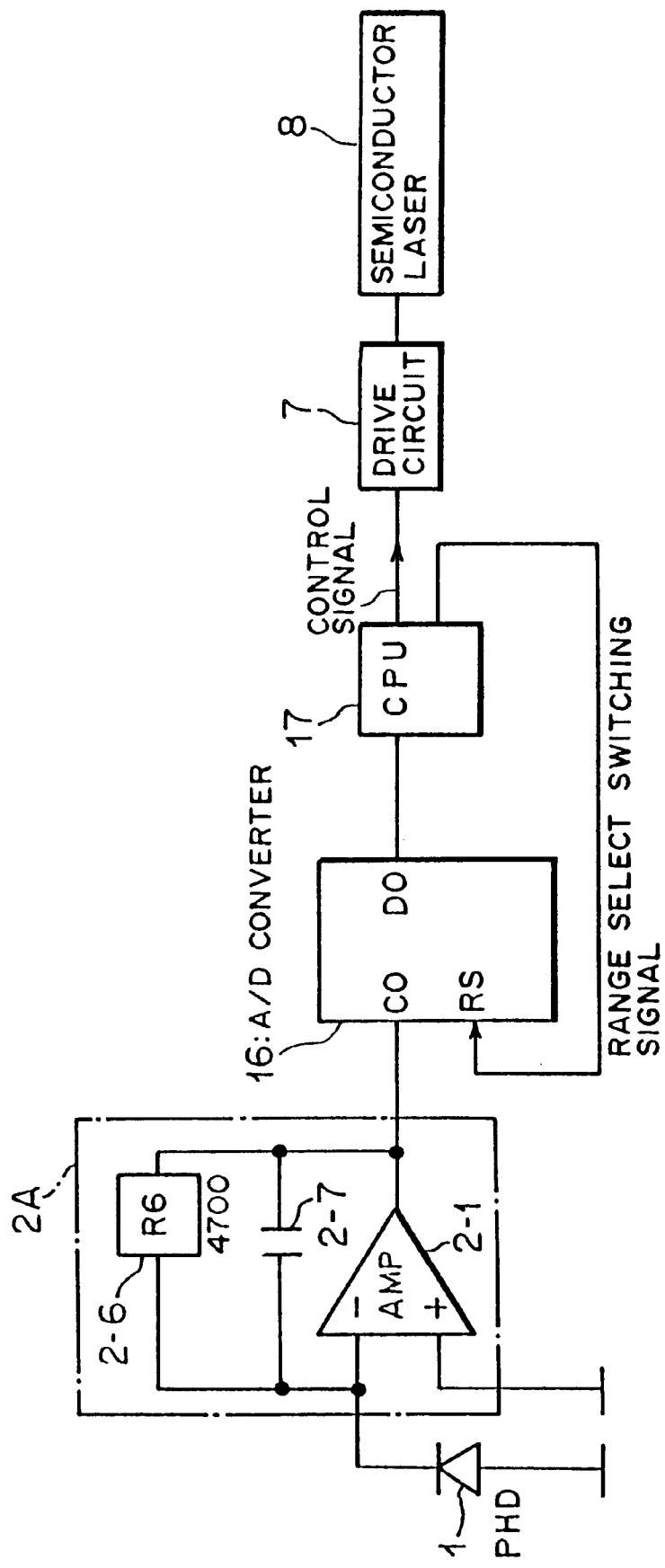
FIG. 19 is a block diagram illustrating a light source lighting controlling device according to the fifth embodiment of the present invention.

(f) Fifth embodiment:

FIG. 19 is a block diagram illustrating the light source lighting controlling device according to the fifth embodiment of the present invention. Like the before-mentioned embodiments, the light source lighting controlling device shown in FIG. 19 can be applied to the bar-code reader shown in FIG. 1. That is, in FIG. 19, the same numerals as those in FIG. 1 represent the same elements.

The light source lighting controlling device according to the present embodiment differs from those of the above-mentioned embodiments in the ambient light detection mode and the level control mode of ambient light level signals to be compared.

The external light detector 1, the amplifier 2A, the drive circuit 7 and the semiconductor laser 8 are similar to those in the second embodiment (refer to FIG. 6). In FIG. 19, the same numerals as those in FIG. 6 represent the same elements.

Referring to FIG. 19, numeral 16 represents an A/D converter. The A/D converter 16 acts as analog to digital converting means which converts an output signal from the external light detector 1 into a digital signal and then outputs it to the CPU 17.

The A/D converter 16 receives the ambient light level signal (analog signal) from the amplifier 2A via the CO terminal and then converts the analog ambient light level signal into a digital signal, thus outputting the digital signal to the CPU 17 (to be described later) via the DO terminal.

The A/D converter 16 can switch the output of the output signal via the DO terminal into two stages including a normal level and an expanded level, based on the range select switch signal (switch signal) received at the RS terminal from the CPU 17 (to be described later).

The normal level means a level at which an ambient light level signal outputs as a digital signal in normal level. The expanded level means a level at which an ambient light level signal outputs as a digital signal having a level larger than the normal level.

Numeral 17 represents a CPU. The CPU 17 functions as control means which compares the level of a digital signal from the A/D converter 16 with a preset reference value and then outputs a switch signal according to the comparison result to switch the range of the A/D converter 16. Thus the CPU 17 can receive an ambient light level signal suitable for the detection of a change in ambient light.

By comparing the level of the digital signal input from the A/D converter 16 with the range switching threshold value and the slice level each acting as a preset reference value, the CPU 17 judges either whether the range set by the A/D converter 16 is suitable or the ambient light level signal is lower than the slice level, thus detecting a change in ambient light level.

Two kinds of values including the upper limit value AD1 usable in a normal level and the lower limit value AD2 in an expanded level (AD1≧AD2) can be set as the above-mentioned threshold value. The slice level can be set by operating data held in the CPU 17 (to be described later).

When it is judged that the range set by the A/D converter 16 is not suitable, the CPU 17 outputs a range-select switch signal to the RS terminal of the A/D converter 16, switches the range of the A/D converter 16 to a suitable range, and can vary the level of ambient light level signal output from the DO terminal (digital signal).

When producing the comparison result representing an ambient level signal with a value smaller than a slice level, the CPU 17 outputs a control signal to the drive circuit 7, thus controlling the lighting of the semiconductor laser 8.

In addition to a method of setting fixedly through a software process, it is considered that a method where a switch formed of a DIP switch (refer to FIG. 14) is connected to the CPU 17, like the fourth embodiment, and a voltage level is applied to the CPU 17 when the switch is turned on, as a method of setting a range switching threshold value and a slice level as a reference value preset by the CPU. In this case, a reference value is set to the CPU 17 by turning on the switch.

The light source lighting controlling device with the above-mentioned configuration applied to the bar-code reader according to the fifth embodiment of the present invention operates as follows:

First an operator places an article over the bar-code reader to perform a bar-code reading operation. Thus the amplifier 2A amplifies an analog electrical signal acting as an ambient light level signal detected by the external light detector 1 and then inputs the result to the A/D converter 16 via the CO terminal.

The A/D converter 16 converts the analog electrical signal into a digital electrical signal and then outputs it to the CPU 17 via the DO terminal. The CPU 17 receives the ambient light level signal as a digital electrical signal from the A/D converter 16 and then monitors the level of the ambient light level signal by comparing the range switching threshold value (to be described later) with the slice level.

Figure 20:
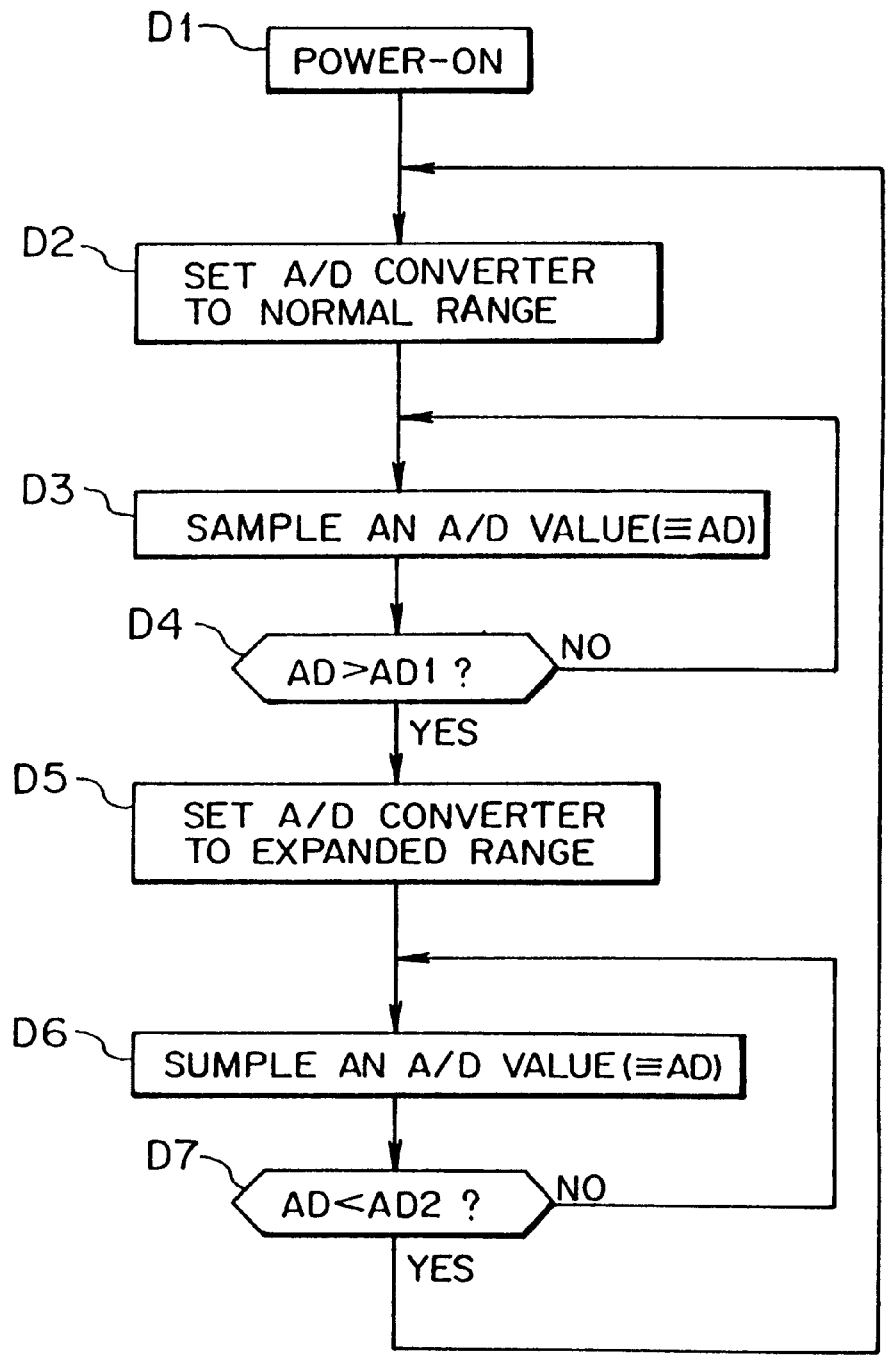
FIG. 20 is a flowchart used for explaining the operation of a light source lighting controlling device according to the fifth embodiment of the present invention.

The CPU 17, as shown with the flowchart in FIG. 20, outputs a range-select switch signal to the A/D converter 16, based on the level of the ambient light level signal, to select the range of the A/D converter 16 to a suitable one. Thus, the level of the ambient light level signal output from the DO terminal of the A/D converter 16 can be controlled variably.

Particularly, immediately after the power source is switched on, the output signal level of the A/D converter 16 is set to a normal one based on the range-select switch signal output from the CPU 17 (steps D1 and D2).

The CPU 17 extracts the digital ambient light level signal AD input from the A/D converter 16 at intervals of a predetermined sampling period (e.g. ts (to be described later)) (step D3) and then compares the ambient light level signal AD with the upper limit value AD1 usable in a normal level as a range switching threshold value.

When the ambient light level signal AD is smaller than the upper limit value AD1, the A/D converter 16 remains in the normal range (NO route in step D4). When the ambient light level signal AD is larger than the upper limit value AD1, the range of the A/D converter 16 is switched to the expanded range by outputting the range-select switch signal AD to the A/D converter 16 (from YES route in step D4 to step D5).

Moreover, like the process in the step D3, the CPU 17 compares the ambient light level signal AD extracted every predetermined sampling period ts with the lower limit value AD2 usable at the expanded level as a range switching threshold (step D6).

When the ambient light level signal AD is larger than the lower limit value AD2, the A/D converter 16 remains in the expanded range (NO route in step D7). When the ambient light level signal AD is larger than the lower limit value AD2, the A/D converter 16 is switched to the normal range by outputting the range-select switch signal to the A/D converter 16 (from YES route in step D7 to step D2).

Figure 21:
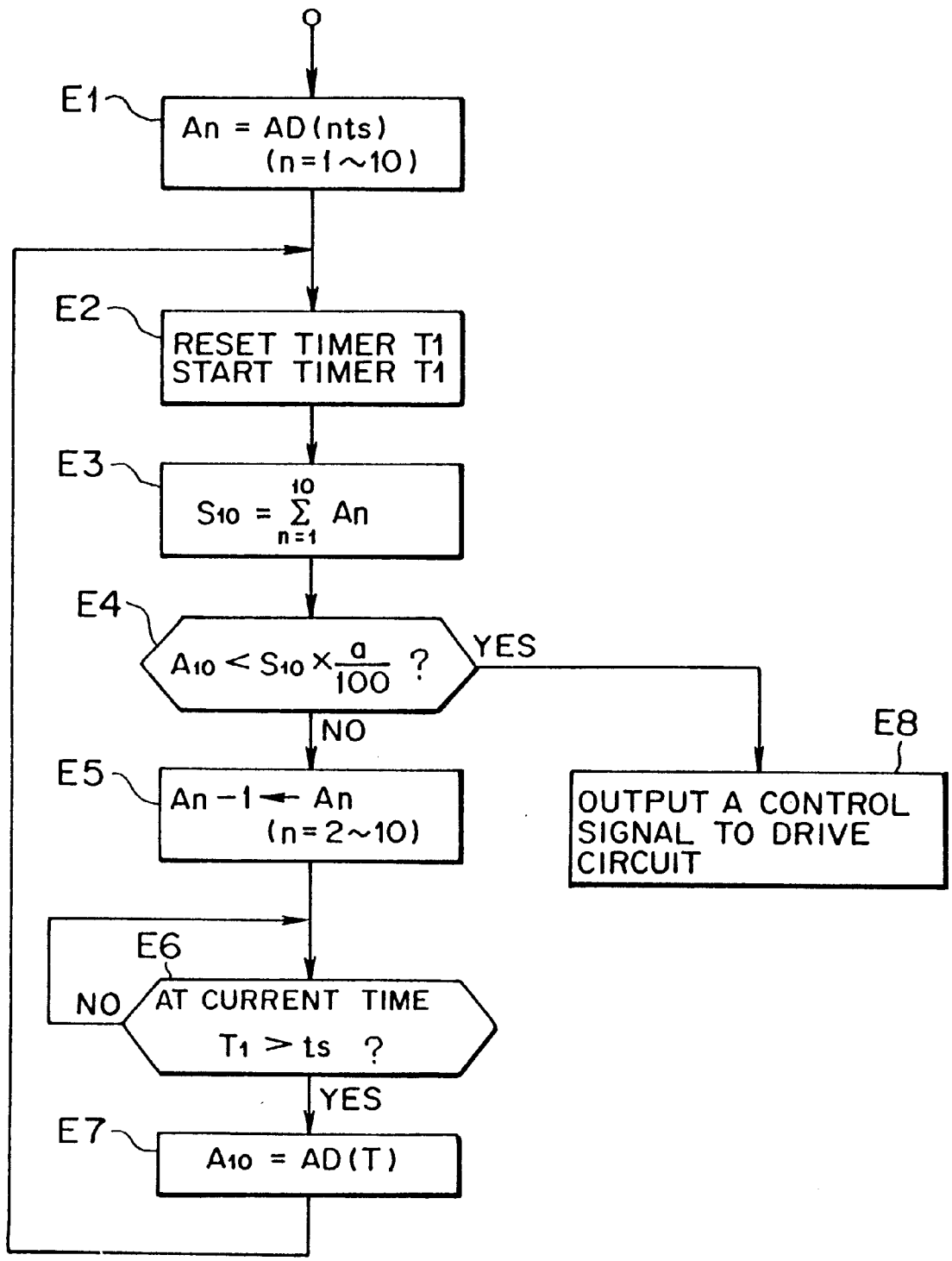
FIG. 21 is a flowchart used for explaining the operation of a light source lighting controlling device according to the fifth embodiment of the present invention.

As shown with the flowchart in FIG. 21, the CPU 17 controls the lighting of the semiconductor laser 8 by detecting a change in ambient light level signal in the bar-code reading operation and then outputting the control signal to the drive circuit 7.

The CPU 17 samples 10 digital ambient light level signals input from the A/D converter 16 every predetermined sampling period ts and then stores them as A1, . . . , and A10, respectively (step E1).

Figure 22:
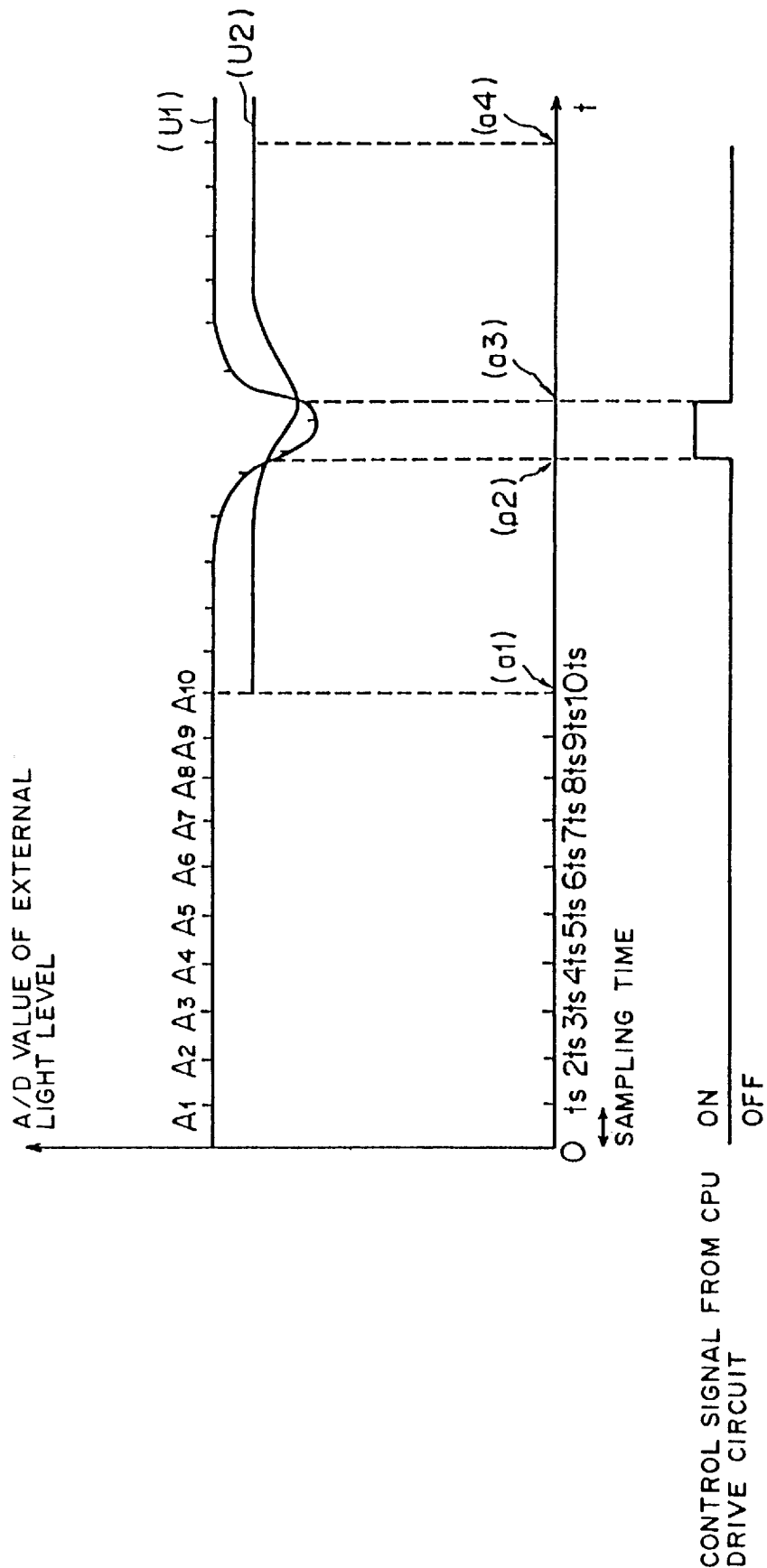
FIG. 22 is a diagram used for explaining the operation of a light source lighting controlling device according to the fifth embodiment of the present invention.

For example, when the amplifier 2A inputs the ambient light level signal (analog signal) shown with U1 in FIG. 22 to the A/D converter 16, the CPU 17 extracts an ambient light level signal (ambient light level signals A1, . . . , A10 corresponding to the time axes ts, . . . , 10 ts) every time ts, based on the digital signal from the A/D converter 16, and then stores them to, for example, the shift register.

The period ts which samples the digital signal is managed by the timer (not shown) in the CPU 17. The timer is reset at the count value ts every time the A/D converter 16 inputs the latest ambient light level signal to the CPU 17 and then starts the counting operation (step E2).

The CPU 17 operates the sum of stored ambient light level signals A1 to A10 (step F3), sets a predetermined ratio (a%) of the sum as a slice level signal (refer to the signal (U2) shown in FIG. 22), and compares the slice level signal with the latest ambient light level signal A10 from the A/D converter 16.

When the ambient light level signal A10 is smaller than the slice level signal (YES route in step E4), the CPU 17 can control the lighting of the semiconductor laser 8 by judging that the ambient light change has been detected in the bar-code reading operation and then outputting an "H" level signal as a control signal to the drive circuit 7 (refer to time (a2) to time (a3) of the signal shown in FIG. 22).

When the ambient light level signal A10 is larger than the slice level signal (refer to NO route in step E4 and time (a1) and (a2) and time (a3) and (a4)), the CPU 17 judges that a change in ambient light due to a bar-code reading operation is not detected and then updates the ambient light level signals A1 to A10 stored.

In other words, when the count value of the timer in the CPU 17 becomes ts by shifting the ambient light level signals A2 to A10 to the signals A1 to A9 (step E5), the area where a new ambient light level signal A10 to be input to the CPU 17 is stored is secured.

Thereafter, when the timer of the CPU 17 counts the count value ts (YES route in step E6), the CPU 17 stores the new ambient light level signal input therein as the signal A10, operates again the slice level signal as described above, and then detects a change in ambient light due to the bar-code reading operation (from step E7 to step E2).

When the semiconductor laser 8 is controlled in lighting in the step E8, the CPU 17 can control intermittently lighting, like the modified example of the third embodiment (refer to the flowchart in FIG. 14).

As described above, according to the light source lighting controlling device applied to the bar-code reader of the fifth embodiment of the present invention, the CPU 17 can convert the ambient light level signal and the slice level signal into a optimum values according to the change width of an ambient light level, respectively, by comparing the level of a digital signal with a predetermined reference value and providing a switch signal for switching the range of the A/D converter 16. Hence, the present embodiment has an advantage similar to the above-mentioned embodiments. Moreover, since any special hardware is not needed to compare an ambient light level signal with a reference voltage and the CPU 17 can perform a batch processing ranging from the comparison of ambient light change to light source control, the present embodiment can simplify the system configuration advantageously.

Figure 23:
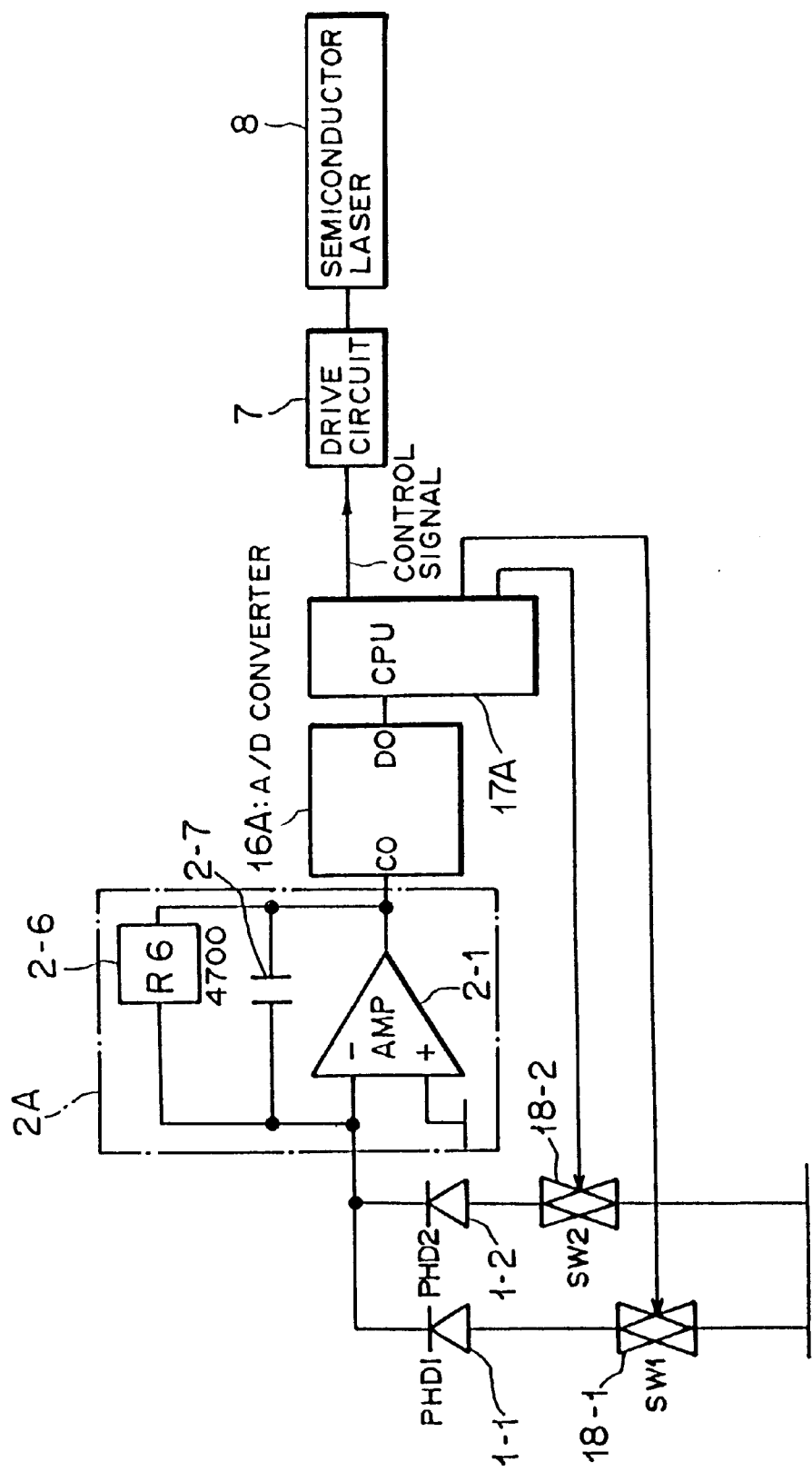
FIG. 23 is a block diagram illustrating a light source lighting controlling device according to a modified example of the sixth embodiment of the present invention.
Figure 24:
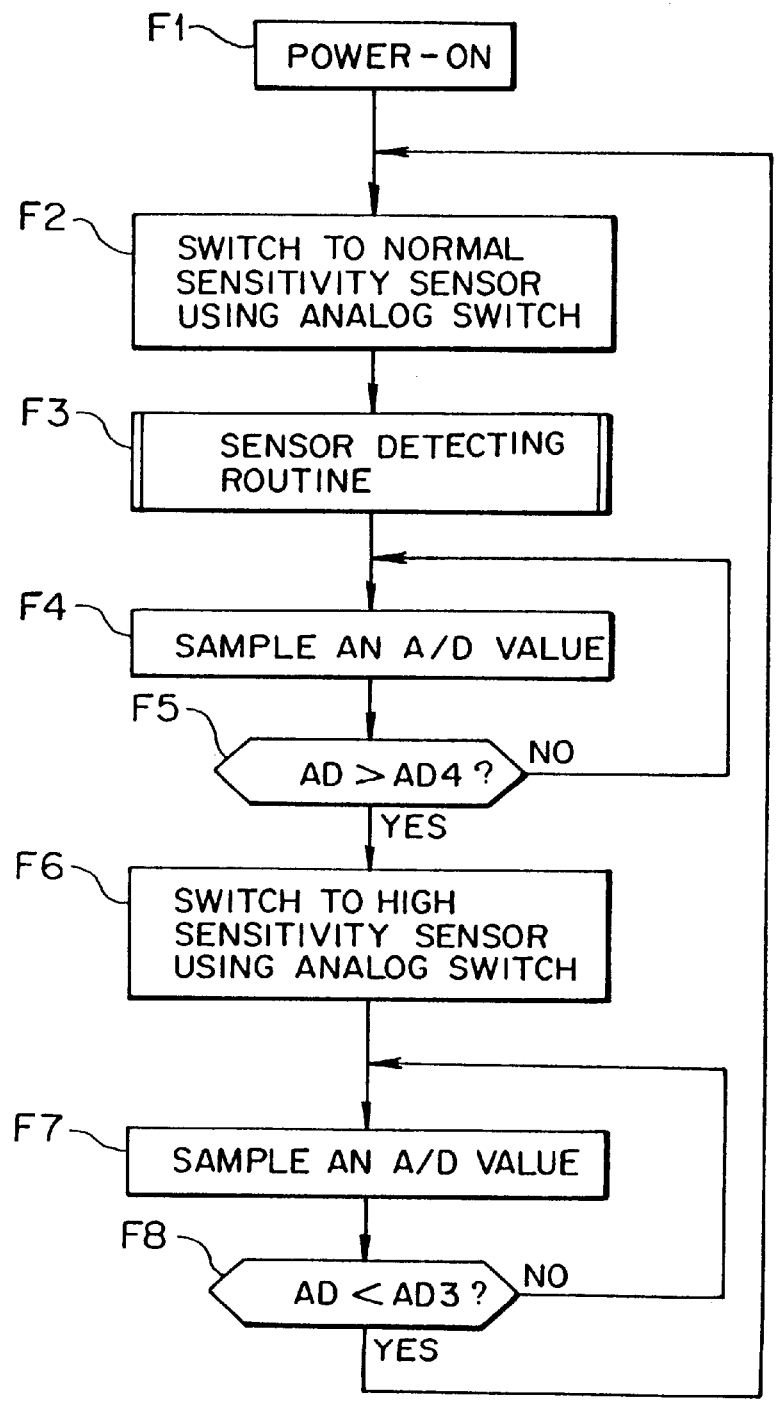
FIG. 24 is a flowchart used for explaining the operation of a light source lighting controlling device according to the sixth embodiment of the present invention.

(g) Sixth embodiment:

FIG. 23 is a block diagram illustrating the light source lighting controlling device according to the sixth embodiment of the present invention. Likewise the already-mentioned embodiments, the light source lighting controlling device shown in FIG. 23 is applicable to the bar-code reader. In FIG. 23, the same numerals as those in FIG. 1 represent the same elements.

Referring to FIG. 23, the amplifier 2A, the drive circuit 7 and the semiconductor laser 8 are similar to those in fifth embodiment (refer to FIG. 19). That is, in FIG. 23, the same numerals shown in FIG. 19 represent the same elements.

Numeral 1-1 represents an external light detector (PHD1) and 1-2 represents an external light detector (PHD2). The external light detectors 1-1 and 1-2 function as ambient light detecting means each which detects light irradiating from the circumferences and then outputs an electrical signal of a different level (e.g. an analog voltage signal). Each of the external light detectors 1-1 and 1-2 is formed of, for example, a photo-diode.

In this case, the external light detector 1-1 converts an incident light into an electrical signal with a normal sensitivity (outputs as an electrical signal of a normal level). The external light detector 1-2 converts an incident light into an electrical signal with a higher sensitivity than the normal sensitivity (outputs as an electrical signal of a higher level than a normal level).

Numerals 18-1 and 18-2 represent switches. The switch 18-1 is connected serially to the external light detector 1-1. The switch 18-2 is connected serially to the external light detector 1-2. The switches 18-1 and 18-2 functions as switching means which validates one of the external light detectors 1-1 and 1-2.

Numeral 16A represents an A/D converter. The A/D converter 16A functions as analog to digital converting means which converts the output signal from the external light detector 1 into a digital signal and then outputs it to the CPU 17.

The A/D converter 16A receives the ambient light level signal (analog signal) from the amplifier 2A via the CP terminal and then converts the analog ambient light level signal into a digital signal, thus outputting the digital signal to the CPU 17 (to be described later) via the DO terminal.

Numeral 17A represents a CPU. The CPU 17A functions as control means which selects the external light detector 1-1 or 1-2 to be operated by comparing the level of the digital signal from the A/D converter 16A with a predetermined reference value and providing a control signal which controls the on/off operation of the switches 18-1 and 18-2.

In other words, unlike that in the fifth embodiment (refer to the numeral 17), the CPU 17A compares the level of a digital signal from the A/D converter 16 with the external light detector selecting threshold and the slice level each acting as a predetermined reference value, selects the external light detector 1-1 or 1-2 which outputs an electrical signal of a predetermined level according to the comparison result, and then outputs a suitable ambient light level signal for the ambient light change detecting operation.

Like the range switching threshold in the fifth embodiment, two kinds of thresholds (AD3≧AD4) including the upper limit value AD3 at which the external light detector 1-1 outputs an electrical signal of a normal level and the lower limit value AD4 at which the external light detector 1-2 outputs an electrical signal of a level larger than the normal level can be set as the above-mentioned external light detector switching threshold. The slice level can be set by performing an operation using data in the CPU 17A (to be described later).

When the CPU 17A judges that the external light detectors 1-1 and 1-2 in use are not suitable, it outputs switch signals to the switches 18-1 and 18-2 to select the external light detector 1-1 or 1-2 to be used. Thus the level of an ambient light level signal (digital signal) input to the CPU 17A can be controlled variably.

Like the fifth embodiment, when the comparison result from the CPU 17A represents the ambient light level signal of less than the slice level, the lighting of the semiconductor laser 8 can be controlled by outputting the control signal to the drive circuit 7.

In addition to a method of setting fixedly through a software process, there is an alternative method as a method of setting the external light detector switching threshold and the slice level each as a reference value preset by the CPU 17A. It is considered that when a switch (refer to numeral 14), for example, a DIP switch which is connected to the CPU 17A is turned on, the voltage level applied to the CPU 17A is set as the reference value. In this case, the reference value is set to the CPU 17A by turning on the switch.

The light source lighting controlling device in the above-mentioned configuration applied to the bar-code reader according to the sixth embodiment operates as follows:

First, an operator places an article over the bar-code reader to perform a bar-code reading operation. After the amplifier 2A amplifies an analog electrical signal as an ambient light level signal detected by the external light detector 1-1 or 1-2, inputs it to the A/D converter 16A via the CO terminal.

The A/D converter 16A converts an analog electrical signal into a digital electrical signal and then outputs it to the CPU 17A via the DO terminal. The CPU 17A receives the ambient light level signal as a digital electrical signal from the A/D converter 16A and monitors the level of the ambient light level signal by comparing the external light detector switching threshold and the slice level (to be described later).

As shown with the flowchart in FIG. 20, the CPU 17A controls variably the level of an input ambient light level signal by outputting switch signals as control signals to the switches 18-1 and 18-2 based on the level of an ambient light level signal, and then switching selectively the external light detector 1-1 or 1-2 which outputs a suitable electrical signal when the CPU 17A detects an ambient light change.

Particularly, just after the power source is switched on, the external light detector 1-1, which detects an ambient light with normal sensitivity, outputs an electrical signal to the amplifier 2A, based on the switch signal output from the CPU 17A (steps F1 and F2).

The CPU 17A extracts a digital ambient light level signal AD input from the A/D converter 16A at intervals of predetermined period (e.g. ts (to be described)) (step F3) and then compares the ambient light level signal AD with the upper limit value AD3 usable in normal level as an external light detector switching threshold.

When the ambient light level signal AD is smaller than the upper limit value AD3, the switch 18-1 remains in its on state (NO route in step F4). When the ambient light level signal is larger than the upper limit value AD3, a switch signal is output to the switches 18-1 and 18-2. Thus the switch 18-2 is turned on to validate a detection signal from the external light detector 1-2 (from YES route in step F4 to step F5).

Moreover, like the process in the step F3, the CPU 17A compares the ambient light level signal AD extracted every predetermined sampling period ts with the lower limit value AD 4 as an external light detector switching threshold which is usable to validate the detection signal from the external light detector 1-2 (step F6).

When the ambient light level signal is larger than the lower limit value AD4, the switch 18-2 remains in on state (NO route in step F7). When the ambient light level signal is larger than the lower limit value AD4, a switching operation is made to validate the detection signal from the external light detector 1-1 by outputting a switch signal to the A/D converter 16A (to step F2 via YES route in step F7).

Like the fifth embodiment (refer to the flowchart in FIG. 21), the CPU 17A controls the lighting of the semiconductor laser 8 by operating a slice level, detecting a change in ambient light level signal in a bar-code reading operation using the slice level operated, and then outputting a control signal to the drive circuit 7.

As described above, according to the light source lighting controlling device applied to the bar-code reader according to the sixth embodiment of the present invention, the CPU 17A can adjust an ambient light level signal and a slice level signal to a suitable value by comparing the level of a digital signal from the A/D converter 16A with a preset reference value, outputting a control signal which controls the on/off operation of the switches 18-1 and 18-2 according to the comparison result, and then selecting the external light detector 1-1 or 1-2 to be operated. Hence there is the same advantage as that in the above-mentioned embodiments. Moreover, the external light detectors 1-1 and 1-2 which output respectively electrical signals with different levels can vary substantially the amplifying factor of the amplifier. Hence there is an advantage in that since the amplifier is not required to control the amplifying factor, the design of the device can be simplified.

In the above-mentioned present embodiment, two sets of a string formed of the external light detector 1-1 which outputs an electrical signal and the switch 18-1 connected to the external detector 1-1 and a string formed of the external light detector 1-2 which outputs an electrical signal of a different level and the switch 18-2 connected to the external detector 1-2 are arranged. The present invention should not be limited only to the present embodiment. The CPU 17A can select controllably the range of the ambient light level signal to at least three steps by arranging three sets or more of strings each formed of an external light detector which outputs an electrical signal of a different level and a switch. Such a method can has the above-mentioned advantage.

(h) Others:

The light source lighting controlling devices according to the above-mentioned embodiments are applicable to the bar-code reader shown in FIG. 1. However, the present invention should not be limited only to the above-mentioned embodiments, but can be used to other applications.

Moreover, according to the above-mentioned embodiments, the light source lighting controlling device includes the drive circuit 7 and the semiconductor laser 8 and uses a change in ambient light detected by the comparator 3 or the CPU 17 or 17A as information for a light source lighting control. However, the present invention should not be limited only to the above-mentioned embodiments. The device which does not have the drive circuit 7 and the semiconductor laser 8, but is formed as an ambient light detecting device which detects merely an ambient light change can be applicable to other applications.

What is claimed is:

1. An ambient light detector, for a system in which a change of state in an ambient environment is detected in terms of a change of ambient light entering from circumferences, the ambient light change tending to vary irregularly, and in which such detection result is utilized as a base on which a discrimination is to be made for stable control of operation of the system irrespective of the irregularity of the ambient light change, said detector comprising:

ambient light detecting means for detecting a level of the ambient light entering from the circumferences and then outputting a detection signal corresponding to the level of the ambient light;

amplifying means for amplifying said detection signal output from said ambient light detecting means;

judging means for evaluating the level of the output from said amplifying means and then outputting a feedback control signal to control the amplifying factor of said amplifying means according to the evaluation result if the level of the output from said amplifying means is outside of an appropriate range acceptable for subsequent signal processing;

signal producing means for producing a slice level signal based on the resultant output from said amplifying means as controlled by said judging means; and comparing means for comparing said resultant level of output of said amplifying means, which output is received from said amplifying means and is the result of the feedback of said judging means, with the slice level signal produced by said signal producing means and then outputting a control signal corresponding to the comparison result to control the system.

2. An ambient light detector according to claim 1, wherein said amplifying means is an amplifying-factor-variable amplifier, and wherein said judging means includes a first comparator for comparing the level of the output of said amplifying means with a first reference value and then outputting a first control signal according to the comparison result to control the operation of said amplifier, and a second comparator for comparing the level of the output of said amplifier with a second reference value different from said first reference value and then outputting a second control signal according to the comparison result to control the operation of said variable amplifier.

3. An ambient light detector, for a system in which a change of state of an ambient is detected in terms of a change of ambient light entering from circumferences, the ambient light change tending to vary irregularly, and in which such detection result is utilized as a base on which a discrimination is to be made for stable control of operation of the system irrespective of the irregularity of the ambient light change, said detector comprising:

ambient light detecting means for detecting a level of the ambient light entering from the circumferences and then outputting a detection signal corresponding to the level of the ambient light;

amplifying means for amplifying the detection signal output from said ambient light detecting means;

signal producing means for producing a slice level signal based on the level of the output of said amplifying means;

judging means for evaluating the level of the output from said amplifying means and then outputting a control signal to control the level of said slice level signal to be outputted from said signal producing means according to the evaluation result if the level of the output from said amplifying means is outside of an appropriate range acceptable for subsequent signal processing; and comparing means for comparing said level of the output of said amplifying means, which output is received from said amplifying means, with said slice level signal output from said signal producing means and then outputting a control signal corresponding to the comparison result to control the system.

4. An ambient light detector according to claim 3, wherein said signal producing means is a voltage divider for dividing the output from said amplifying means according to a voltage division ratio to output a slice level signal, said voltage division ratio being of said voltage divider being variable according to the control signal output from said judging means, said voltage divider including first and second resistors, a third resistor connected in parallel to said second resistor, and an analog switch connected in series to said third resistor for control the on/off connection state of said third resistor with respect to said first and second resistor so that said voltage division ratio may be determined by said first and second resistors when said analog switch is turned off or by said first, second and third resistors when said analog switch is turned on, and wherein said judging means including a maximum value updating circuit connected to the output of said amplifying means for updating and storing a maximum level value of the output of said amplifying means, a minimum value updating circuit connected to the output of said amplifying means parallel to said maximum value updating circuit for updating and storing a minimum level value of the output of said amplifying means, a differential amplifier connected respectively to the outputs of said maximum and minimum value updating circuits for operating the differential between the maximum level value of the output of said amplifying means, which output has been updated and stored in said maximum value updating circuit, and the minimum level value of the output of said amplifying means, which output has been updated and stored in said minimum value updating circuit, and a comparator connected to the output of said differential amplifier for comparing said differential between the maximum and minimum level values, which differential has been operated by said differential amplifier, with a predetermined threshold and outputting a control signal to selectively turn on or off said analog switch when said differential value is smaller or larger than said threshold, and vice versa.

5. An ambient light detector, for a system in which a change of an ambient environment is detected in terms of a change of ambient light entering from circumferences, the ambient light change tending to vary irregularly, and in which such detection result is utilized as a base on which a discrimination is to be made for stable control of operation of the system irrespective of the irregularity of the ambient light change, said detector comprising:

ambient light detecting means for detecting a level of the ambient light entering from the circumferences and then outputting a detection signal corresponding to the level of the ambient light;

amplifying means for amplifying the detection signal output from said ambient light detecting means;

signal producing means for producing a slice level signal based on the output of said amplifying means, said signal producing means being in the form of a voltage divider for dividing the output of said amplifying means according to a voltage division ratio to output a slice level signal;

comparing means for comparing the level of the output of said amplifying means, which output is received from said amplifying means, with said slice level signal output from said signal producing means and then outputting a signal corresponding to the result; and time measuring means for starting a time-measuring operation when a power source is switched on and then outputting a control signal after a lapse of a predetermined period of time to said voltage divider to control the level of said slice level signal, said time measuring means being adapted to be reset according to the comparison result from said comparing means.

6. An ambient light detector, for a system in which a change of state of an ambient environment is detected in terms of a change of ambient light entering from circumferences, the ambient light change tending to vary irregularly, and in which such detection result is utilized as a base on which a discrimination is to be made for stable control of operation of the system irrespective of the irregularity of the ambient light change, said detector comprising:

ambient light detecting means for detecting a level of the ambient light entering from circumferences and outputting a detection signal corresponding to the light amount thereof;

control means for outputting a predetermined slice level signal;

comparing means for comparing the level of said detection signal output from said ambient light detector with said slice level signal produced by said control means and then outputting a signal corresponding to the result; and switching means for switching the operational status of said control means;

said control means being adapted to store the level of said electrical signal output from said ambient light detecting means when the operational status is switched by an operation of said switching means and then producing a slice level signal based on the level of said electrical signal stored.

7. An ambient light detector comprising:

ambient light detecting means for detecting light entering from circumferences and outputting an electrical signal corresponding to the light amount thereof;

control means for outputting a predetermined slice level signal;

comparing means for comparing said electrical signal with said slice level signal and then outputting a signal corresponding to the result; and switching means for switching the operational status of said control means;

said control means storing the level of said electrical signal sent from said ambient light detecting means when the operational status is switched by an operation of said switching means and then producing a slice level signal based on the level of said electrical signal stored, wherein said control means stores said electrical signal from said ambient light detecting means in the form of a digital signal and then outputs a slice level signal in the form of a digital signal and wherein said control means comprises analog to digital converting means for converting an output signal from said ambient light detecting means into a digital signal and then outputting the result to said control means, and digital to analog converting means for converting a digital slice level signal sent from said control means into an analog slice level signal and then outputting the result to said comparing means.

8. An ambient light detector, for a system in which a change of state in an ambient environment is detected in terms of a change of ambient light entering from circumferences, the ambient light change tending to vary irregularly, and in which such detection result is utilized as a base on which a discrimination is to be made for stable control of operation of the system irrespective of the irregularity of the ambient light change, said detector comprising:

ambient light detecting means for detecting a level of the ambient light entering from circumferences and then outputting an analog detection signal corresponding to the level of the ambient light;

amplifying means for amplifying the detection signal output from said ambient light detecting means;

an analog to digital converter for converting said analog detection signal output, as amplified by said amplifying means, into selectively a digital signal in a normal level or in an expanded level larger than the normal level if said analog detection signal output is off an appropriate range acceptable for subsequent signal processing; and control means for comparing the level of said digital signal from said analog to digital converter with a predetermined reference value and then outputting a range select switch signal according to the comparison result to switch the range of said analog to digital converter to a suitable range and to vary the level of said digital signal from analog to digital signal and to control the lighting of the system.

9. An ambient light detector, for a system in which a change in an ambient environment is detected in terms of a change of ambient light entering from circumferences, the ambient light change tending to vary irregularly, and in which such detection result is utilized as a base on which a discrimination is to be made for stable control of operation of the system irrespective of the irregularity of the ambient light change, said detector comprising:

a plurality of ambient light detectors each for detecting a level of the ambient light entering from circumferences and then outputting a detection signal corresponding to the level of the ambient light and different in level from that output from another ambient light detector;

switching means connected to each of said plurality of ambient light detectors, for validating the operation of one of said ambient light detectors at a time; and control means for comparing said detection signal output from one in operation among said plural ambient light detectors, which output is received from said selected ambient light detector, with a predetermined reference value and then outputting a control signal according to the comparison result to control the on/off operation of said switching means, in such a way that one of said ambient light detectors may be selected for operation.

10. A light source lighting controlling device for controlling lighting of a light source in a system in which a change of state in an ambient environment is detected in terms of a change of ambient light entering from circumferences, the ambient light change tending to vary irregularly, and in which such detection result is utilized as a base on which a discrimination is to be made for stable control of lighting of the light source irrespective of the irregularity of the ambient light change, said device comprising:

an ambient light detector for detecting a level of the ambient light entering from circumferences and then outputting a detection signal corresponding to the level of the ambient light;

amplifying means for amplifying the output from said ambient light detector;

signal producing means for producing a slice level signal based on the output from said amplifying means;

judging means for evaluating the level of the output from said amplifying means and then outputting a control signal to control the amplifying factor of said amplifier in accordance with the evaluation result if the level of the output from said amplifying means is outside of an appropriate range acceptable for subsequent signal processing;

comparing means for comparing the output of said amplifying means, which output is received from said amplifying means, with said slice level signal and then outputting a signal according to the comparison result; and light source drive circuit for controlling the lighting status of the light source according to said signal output from said comparing means.

11. A light source lighting controlling device according to claim 10, wherein said amplifying means is a multiplying-factor-variable amplifier, and wherein said judging means includes a first comparator for comparing the level of the output of said amplifying means with a first reference value and then outputting a first control signal to control the operation of said amplifier, and a second comparator for comparing the level of the output of said amplifier with a second reference value different from said first reference value and then outputting a second switching signal to control the operation of said amplifier.

12. A light source lighting controlling device for controlling lighting of a light source of a system in which a change of state in an ambient environment is detected in terms of a change of ambient light entering from circumferences, the ambient light change tending to vary irregularly, and in which such detection result is utilized as a base on which a discrimination is to be made for stable control of lighting of the light source irrespective of the irregularity of the ambient light change, said device comprising:

ambient light detecting means for detecting a level of the ambient light entering from circumferences and then outputting a detection signal corresponding to the level of the ambient light;

signal producing means for producing a slice level signal based on the output of said ambient light detecting means;

judging means for evaluating the output from said ambient light detecting means and then outputting a control signal to control the level of said slice signal output from said signal producing means according to the evaluation result if the level of the output from said ambient light detecting means is off and appropriate range acceptable for subsequent signal processing;

comparing means for comparing said resultant level of the output of said ambient detecting means, which output is the result of the feedback of said judging means, with said slice level signal produced by said signal producing means and then outputting a signal according to the comparison result; and a light source drive circuit for controlling the lighting status of the light source in accordance with said signal output from said comparing means.

13. A light source lighting controlling device according to claim 12, wherein said signal producing means is a voltage divider for dividing the output from said ambient light detecting means in accordance with a varying voltage division ratio to output a slice level signal, said voltage division ratio being of said voltage divider being variable according to the control signal output from said judging means, said voltage divider including first and second resistors, a third resistor connected in parallel to said second resistor, and an analog switch connected in series to said third resistor for control the on/off connection state of said third resistor with respect to said first and second resistor so that said voltage division ratio may be determined by said first and second resistors when said analog switch is turned off or by said first, second and third resistors when said analog switch is turned on, and wherein said judging means including a maximum value updating circuit connected to the output of said judging means for updating and storing a maximum level value of the output of said amplifying means, a minimum value updating circuit connected to the output of said amplifying means parallel to said maximum value updating circuit for updating and storing a minimum level value of the output of said amplifying means, a differential amplifier connected respectively to the outputs of said maximum and minimum value updating circuits for operating the differential between the maximum level value of the output of said amplifying means, which output has been updated and stored in said maximum value updating circuit, and the minimum level value of the output of said amplifying means, which output has been updated and stored in said minimum value updating circuit, and a comparator connected to the output of said differential amplifier for comparing said differential between the maximum and minimum level values, which differential has been operated by said differential amplifier, with a predetermined threshold and outputting a control signal to selectively turn on or off said analog switch when said differential value is smaller or larger than said threshold, and vice versa.

14. A light source lighting controlling device for controlling light of a light source of a system in which a change of state in an ambient environment is detected in terms of a change of ambient light entering from circumferences, the ambient light change tending to vary irregularly, and in which such detection result is utilized as a base on which a discrimination is to be made for stable control of lighting of the light source irrespective of the irregularity of the ambient light change, said device comprising:

ambient light detecting means for detecting a level of the ambient light entering from the circumferences and then outputting a detection signal corresponding to the level of the ambient light;

signal producing means for producing a slice level signal based on the output of said amplifying means, said signal producing means being in the form of a voltage divider for dividing the output of said amplifying means according to a voltage division ratio to output a slice level signal;

time measuring means for starting a time-measuring operation when a power source is switched on and then outputting a control signal after a lapse of a predetermined period of time to said voltage divider to control the level of said slice level signal:

comparing means for comparing the level of the output of said amplifying means, which output is received from said amplifying means, with said slice level signal output from said signal producing means and then outputting a signal corresponding to the comparison result; and light source drive means for performing lighting control of the light source in accordance with said signal output from said comparing means; said time measuring means being adapted to be reset according to the comparison result from said comparing means.

15. A light source lighting controlling device for controlling light of a light source of a system in which a change of state in an ambient environment is detected in terms of a change of ambient light entering from circumferences, the ambient light change tending to vary irregularly, and in which such detection result is utilized as a base on which a discrimination is to be made for stable control of lighting of the light source irrespective of the irregularity of the ambient light change, said device comprising:

ambient light detecting means for detecting a level of the ambient light entering from circumferences and outputting detection signal corresponding to the level of the ambient light;

control means for outputting a predetermined slice level signal;

comparing means for comparing the level of the output of said ambient light detecting means with said slice level signal produced by said control means and then outputting a control signal corresponding to the comparison result;

light source drive means for performing lighting control of said light source in accordance with said control signal; and switching means for switching the operational status of said control means;

said control means adapted to store the level of said electrical signal sent from said ambient light detecting means based on the operational status switched due to an operation of said switching means and outputs a slice level signal based on the level of said electrical signal stored.

16. A light source lighting controlling device which includes a light source and turns controllably on and off said light source, comprising:

ambient light detecting means for detecting light entering from circumferences and outputting an electrical signal corresponding to the light amount thereof;

control means for outputting a predetermined slice level signal;

comparing means for comparing said electrical signal with said slice level signal and then outputting a control signal corresponding to the result;

light source drive means for performing lighting control of said light source in accordance with said control signal; and switching means for switching the operational status of said control means;

said control means storing the level of said electrical signal sent from said ambient light detecting means based on the operational status switched due to an operation of said switching means and outputs a slice level signal based on the level of said electrical signal stored, said light controlling device further comprising analog to digital converting means for converting an output signal from said ambient light detecting device into a digital signal and then outputting the result to said control means, and digital to analog converting means for converting a digital slice level signal sent from said control means into an analog slice level signal and then outputting the result to said comparing means; and wherein said control means stores an electrical signal from said ambient light detecting means in the form of a digital signal and outputs a slice level signal in the form of a digital signal.

17. A light source lighting controlling device, for controlling lighting of a light source of a system in which a change of state in an ambient environment is detected in terms of a change of ambient light entering from circumferences, the ambient light change tending to vary irregularly, and in which such detection result is utilized as a base on which a discrimination is to be made for stable control of lighting of the light source irrespective of the irregularity of the ambient light change, said device comprising:

an ambient light detector for detecting a level of the ambient light entering from the circumferences and then outputting an analog detection signal corresponding to the level of the ambient light;

an analog to digital converter for converting said analog detection signal output from said ambient light detector into a digital signal;

control means for comparing said digital signal output from said analog to digital converter with a reference value and then outputting a control signal according to the comparison result, said control means being adapted for evaluating the level of said digital signal from said analog to digital converter and then outputting a switch signal to switch the range of said analog to digital converter when said digital signal is larger than a predetermined upper limit value or smaller than a predetermined lower limit value; and light source drive means for controlling the lighting status of the light source in accordance with said control signal output from said control means.

18. A light source lighting controlling device, for controlling lighting of a light source of a system in which a change of state in an ambient environment is detected in terms of a change of ambient light entering from circumferences, the ambient light change tending to vary irregularly, and in which such detection result is utilized as a base on which a discrimination is to be made for stable control of lighting of the light source irrespective of the irregularity of the ambient light change, said detector comprising:

a plurality of ambient light detectors each for detecting a level of the ambient light entering from circumferences and then outputting a detection signal corresponding to the level of the ambient light and different in level from that output from another ambient light detector;

switching means connected to each of said plural ambient light detectors, for validating the operation of one of said plural ambient light detectors at a time;

control means for comparing said detection signal output from one in operation among said plural ambient light detectors, which output is received from said selected ambient light detector, with a predetermined reference value and then outputting a control signal according to the comparison result to control the on/off operation of said switching means, in such a way that one of said ambient light detectors may be selected for operation, if the level of said detection signal output is off an appropriate range acceptable for subsequent signal processing; and light source drive means for controlling the lighting of the light source according to said control signal output from said control means.

19. A mark reader for reading a mark labeled on an article, when the article is placed over a reading window outside a housing of said reader, by irradiating a light beam onto the mark through the reading window from a light source disposed inside the housing and in which such placing of the article over the reading window is detected in terms of a change in ambient light coming into the housing through the reading window from circumferences, the ambient light change tending to vary irregularly, for the purpose of automatically controlling lighting of the light source irrespective of the irregularity of the ambient light change, said reader comprising:

an ambient light detector for detecting a level of the ambient light entering into the housing through the reading window and then outputting a detection signal corresponding to the level of the ambient light;

an amplifier for amplifying the detection signal output from said ambient light detector;

judging means for evaluating the level of the output from said amplifying means and then outputting a control signal to control the amplifying factor of said amplifying means in accordance with the evaluation result if the level of the output from said amplifying means is outside of an appropriate range acceptable for subsequent signal processing:

a voltage divider for dividing the output from said amplifier according to a voltage division ratio to output a slice level signal, said voltage division ratio being variable according to the control signal output from said judging means;

comparing means for comparing the level of the resultant output of said amplifier, which output is received from said amplifier and the result of the feedback of said judging means, with the output of said slice level signal output from said voltage divider and then outputting a signal according to the comparison result; and light source drive means for controlling the lighting status of the light source in accordance with said signal output from said comparing means.

20. A mark reader according to claim 19, wherein said amplifying means includes an amplifying-factor-variable amplifier, and said judging means includes a first comparator for comparing the level of the output of said amplifying means with a first reference value and then outputting a first control signal to control the operation of said variable amplifier in one way, and a second comparator for comparing the level of the output of said amplifier with a second reference value different from said first reference value and then outputting a second control signal to control the operation of said variable amplifier in another way.

21. A mark reader for reading a mark labeled on an article, when the article is placed over a reading window outside a housing of said reader, by irradiating a light beam onto the mark through the reading window from a light source disposed inside the housing and in which such placing of the article over the reading window is detected in terms of a change in ambient light coming into the housing through the reading window from circumferences, the ambient light change tending to vary irregularly, for the purpose of automatically controlling the light source in lighting irrespective of the irregularity of the ambient light change, said reader comprising:

an ambient light detector for detecting a level of the ambient light entering into the housing through the reading window and then outputting a detection signal corresponding to the level of the ambient light;

a voltage divider for dividing the output from said ambient light detector according to a voltage division ratio to output a slice level signal;

a judging circuit for evaluating the level of the output from said ambient light detector and then outputting a control signal to control the voltage division ratio of said voltage divider according to the evaluation result if the level of the output from said ambient light detector is outside of an appropriate range acceptable for subsequent signal processing;

a comparator for comparing the output of said ambient light detector with the output of said voltage divider and outputting a signal according to the comparison result; and a light source drive circuit for controlling the lighting status of the light source in accordance with the signal output from said comparator; and judging means for judging the level of the output from said ambient light detecting means and then outputting a control signal to control the voltage division ratio of said voltage dividing means, according to the judging result.

22. A mark reader for reading a mark labeled on an article, when the article is placed over a reading window outside a housing of said reader, by irradiating a light beam onto the mark through the reading window from a light source disposed inside the housing and in which such placing of the article over the reading window is detected in terms of a change in ambient light coming into the housing through the reading window from circumferences, the ambient light change tending to vary irregularly for the purpose of automatically controlling the light source in lighting, said reader comprising;

an ambient light detector for detecting a level of the ambient light entering into the housing through the reading window and then outputting a detection signal corresponding to the level of the ambient light;

signal producing means for producing a slice level signal;

comparing means for comparing the level of said detection signal output from said ambient light detector with the level of said slice level signal produced by said signal producing means and then outputting a signal according to the comparison result;

time measuring means for starting a time-measuring operation, when a power source is switched on, and then outputting a control signal, after a lapse of a predetermined period of time, to said signal producing means to control the level of said slice level signal if the level of the detection signal output from said ambient light detector is outside of an appropriate range acceptable for subsequent signal processing, said time measuring means being adapted to be reset upon receipt of said signal output from said comparing means in accordance with the comparison result; and light source drive means for performing the lighting control of the light source in accordance with the signal output from said comparing means.

23. A reader for reading a mark labeled on an article, when the article is placed over a reading window outside a housing of said reader, by irradiating a light beam onto the mark through the reading window from a light source disposed inside the housing and in which such placing of the article over the reading window is detected in terms of a change in ambient light coming into the housing through the reading window from circumferences, the ambient light change tending to vary irregularly for the purpose of automatically controlling the light source in lighting irrespective of the irregularity of the ambient light change, said reader comprising:

an ambient light detector for detecting a level of the ambient light entering into the housing through the reading window and then outputting a detection signal corresponding to the level of the ambient light;

control means for outputting a predetermined slice level signal;

comparing means for comparing the level of said detection signal output from said ambient light detector with the level of said slice level signal produced by said control means and then outputting a signal according to the comparison result;

light source drive means for performing the lighting control of said light source in accordance with the control signal; and switching means for switching the operational status of said control means;

said control means being adapted to store the level of a detection signal from said ambient light detecting means when said switching means witches an operational status and also to produce a slice level signal according to the stored level of the detection signal.

24. A reader which includes a light source and light detecting means, wherein a mark formed on an article is read by operationally irradiating light from said light source onto said article and detecting light reflected on said article using light detecting means, comprising:

ambient light detecting means for detecting light entering from circumferences and outputting an electrical signal corresponding to the light amount thereof;

control means for outputting a predetermined slice level signal;

comparing means for comparing said electrical signal with said slice level signal and outputting a signal according to the result;

light source drive means for performing the lighting control of said light source in accordance with the control signal; and switching means for switching the operational status of said control means;

said control means storing the level of an electrical signal from said ambient light detecting means when said switching means switches an operational status;

said control means producing a slice level signal according to the electrical signal level stored, said reader further comprising analog to digital converging means for converting an output signal from said ambient light detecting device into a digital signal and then outputting the result to said control means, and digital to analog converting means for converting a digital slice level signal sent from said control means into an analog slice level signal and then outputting the result to said comparing means; and wherein said control means stores an electrical signal from said ambient light detecting means in the form of a digital signal and producing a slice level signal in the form of a digital signal.

25. A mark reader for reading a mark labeled on an article, when the article is placed over a reading window outside a housing of said reader, by irradiating a light beam onto the mark through the reading window from a light source disposed inside the housing and in which such placing of the article over the reading window is detected in terms of a change in ambient light coming into the housing through the reading window from circumferences, the ambient light change tending to vary irregularly, for the purpose of automatically controlling the light source in lighting irrespective of the irregularity of the ambient light change, said reader comprising:

ambient light detecting means for detecting a level of the ambient light entering into the housing through the reading window and then outputting a detection signal corresponding to the level of the ambient light;

an analog to digital converter for converting said analog detection signal output from said ambient light detector into a digital signal;

control means for comparing said digital signal output from said analog to digital converter with a reference value and then outputting a control signal according to the comparison result, said control means being adapted for evaluating the level of said digital signal from said analog to digital converter and then outputting, if the level of the detection signal of said ambient light detector is off an appropriate range acceptable for subsequent signal processing, a switch signal to switch the range of said analog to digital converter when said digital signal is larger than a predetermined upper limit value or smaller than a predetermined lower limit value; and light source drive means for controlling the lighting status of the light source according to said control signal output from said control means.

26. A mark reader for reading a mark labeled on an article, when the article is placed over a reading window outside a housing of said reader, by irradiating a beam onto the mark through the reading window from a light source disposed inside the housing and in which such placing of the article over the reading window is detected in terms of a change in ambient light coming into the housing through the reading window from circumferences, the ambient light change tending to vary irregularly, for the purpose of automatically controlling the light source in lighting irrespective of the irregularity of the ambient light change, said reader comprising:

a plurality of ambient light detectors each for detecting a level of the ambient light entering into the housing through the reading window and then outputting an analog detection signal corresponding to the level of the ambient light and different in level from that output from another ambient light detector;

switching means connected to each of said plural ambient light detectors, for validating the operation of one of said plural ambient light detectors at a time;

an analog to digital converter for converting said analog detection signal output from one in operation among said plural ambient light detectors into a digital signal;

control means for comparing said digital signal output from said analog to digital converter with a reference value and then outputting a control signal according to the comparison result, said control means being adapted for evaluating the level of said digital signal from said detection analog to digital converter and then outputting a control signal, when said digital signal is larger than a predetermined upper limit value or smaller than a predetermined lower limit value, to control the on/off operation of said switching means according to said evaluation result, thus selecting one of said ambient light detectors to be operated; and light source drive means for controlling the lighting status of the light source according to said control signal output from said control means.

* * * * *